(12) United States Patent
Kitajima

(10) Patent No.: US 9,086,723 B2
(45) Date of Patent: Jul. 21, 2015

(54) IMAGE PROCESSING APPARATUS AND CONTROL METHOD FOR DETERMINING AND ASSOCIATING PRIVATE INFORMATION WITH AN IMAGE

(71) Applicant: CANON KABUSHIKI KAISHA, Tokyo (JP)

(72) Inventor: Kotaro Kitajima, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 94 days.

(21) Appl. No.: 13/893,798

(22) Filed: May 14, 2013

(65) Prior Publication Data

US 2013/0308000 A1  Nov. 21, 2013

(30) Foreign Application Priority Data

May 15, 2012 (JP) ................................. 2012-111888

(51) Int. Cl.
*H04N 5/76* (2006.01)
*G06F 3/00* (2006.01)
*G06Q 10/10* (2012.01)
*G06F 21/62* (2013.01)
*G06F 21/31* (2013.01)

(52) U.S. Cl.
CPC ............... *G06F 3/005* (2013.01); *G06F 21/31* (2013.01); *G06F 21/6245* (2013.01); *G06Q 10/1091* (2013.01); *G06F 2221/2141* (2013.01); *G06F 2221/2143* (2013.01)

(58) Field of Classification Search
CPC ..... H04N 1/4406; H04N 5/772; H04N 5/907; H04N 1/2112; H04N 2101/00; H04N 9/8047
USPC ................................. 348/222.1, 231.1–231.99
See application file for complete search history.

(56) References Cited

U.S. PATENT DOCUMENTS

| 2009/0322904 | A1* | 12/2009 | Takahashi | 348/231.3 |
| 2011/0043658 | A1* | 2/2011 | Sasai | 348/231.3 |
| 2011/0267496 | A1* | 11/2011 | Nakamura et al. | 348/231.7 |
| 2011/0292231 | A1* | 12/2011 | Winters | 348/222.1 |
| 2014/0152868 | A1* | 6/2014 | Nakamura et al. | 348/231.3 |

FOREIGN PATENT DOCUMENTS

JP   2011-120214 A   6/2011

* cited by examiner

*Primary Examiner* — Tuan Ho
*Assistant Examiner* — Selam Gebriel
(74) *Attorney, Agent, or Firm* — Canon USA, Inc. I.P. Division

(57) ABSTRACT

An image processing apparatus connectable with an information processing apparatus, includes an acquisition unit configured to acquire an image obtained by image-capturing an object, a unit configured to acquire image capturing information indicating information on image-capturing of the object, a determination unit configured to determine whether the image capturing information is private information, and an association unit configured to, in a case where the determination unit determines that the image capturing information is not private information, associate the image capturing information with the image, wherein in a case where the determination unit determines that the image capturing information is private information, the association unit associates link information for acquiring the image capturing information based on an access condition set in the image capturing information with the image, instead of associating the image capturing information with the image.

14 Claims, 20 Drawing Sheets

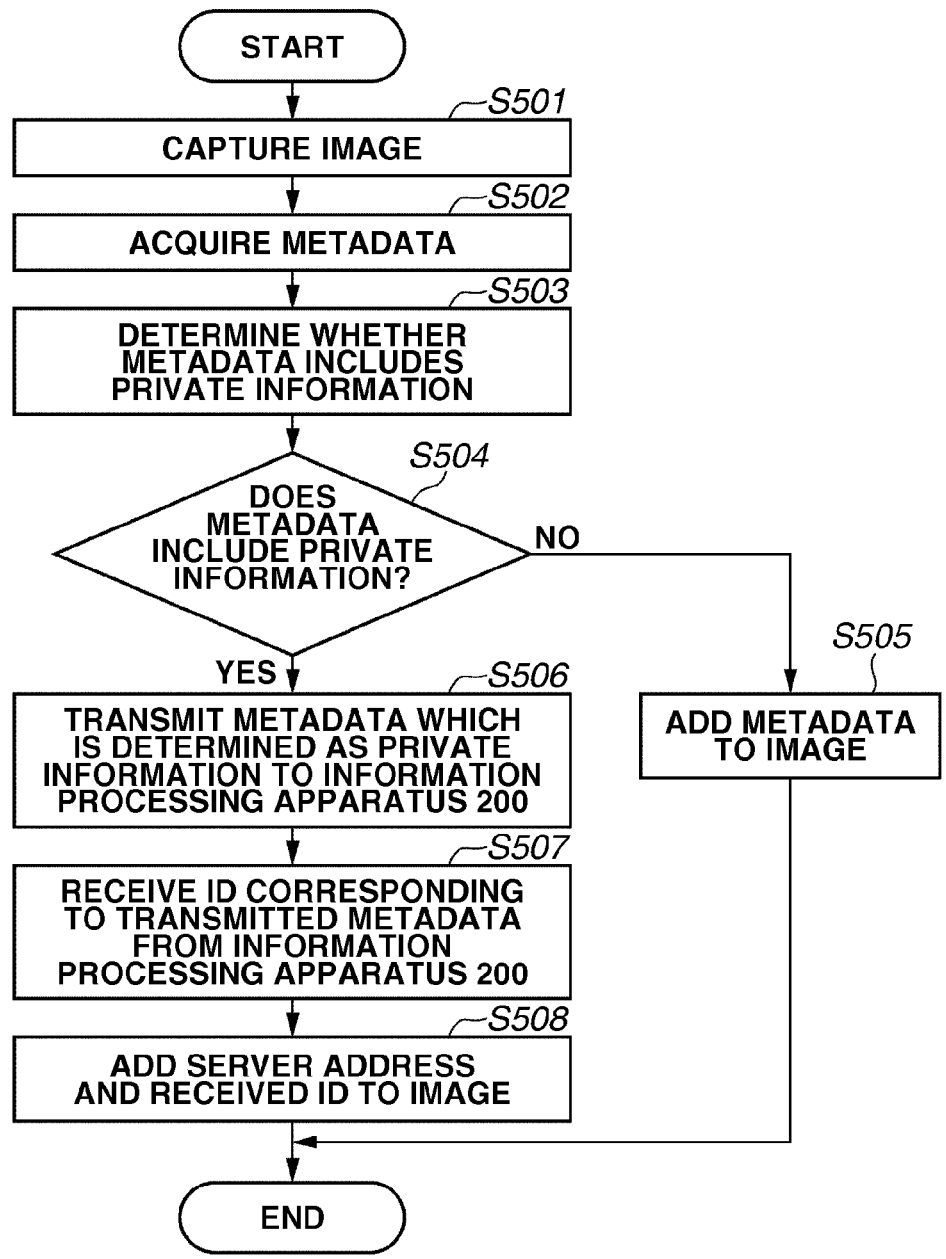

FIG.7A

MANUFACTURER NAME: XXX

MODEL NAME: CAMERAXX

CAPTURED DATE: 2010/04/○○ 16:15

IMAGE SIZE: 4000 × 2000

⋮

LOCATION INFORMATION
    LATITUDE: XX, XX, XX
    LONGITUDE: YY, YY, YY

⋮

USER NAME: usrAAAA

FIG.7B

MANUFACTURER NAME: XXX

MODEL NAME: CAMERAXX

CAPTURED DATE: 2010/04/ 16:15

IMAGE SIZE: 4000 × 2000

⋮

LOCATION INFORMATION
    LATITUDE:
    LONGITUDE:

USER NAME:

⋮

NOTE FROM MANUFACTURER
  ADDRESS OF INFORMATION PROCESSING ~703
  APPARATUS 200
    ○○○.○○○.○○.○

LOCATION ID  1234 ~704

USER ID     5678 ~705

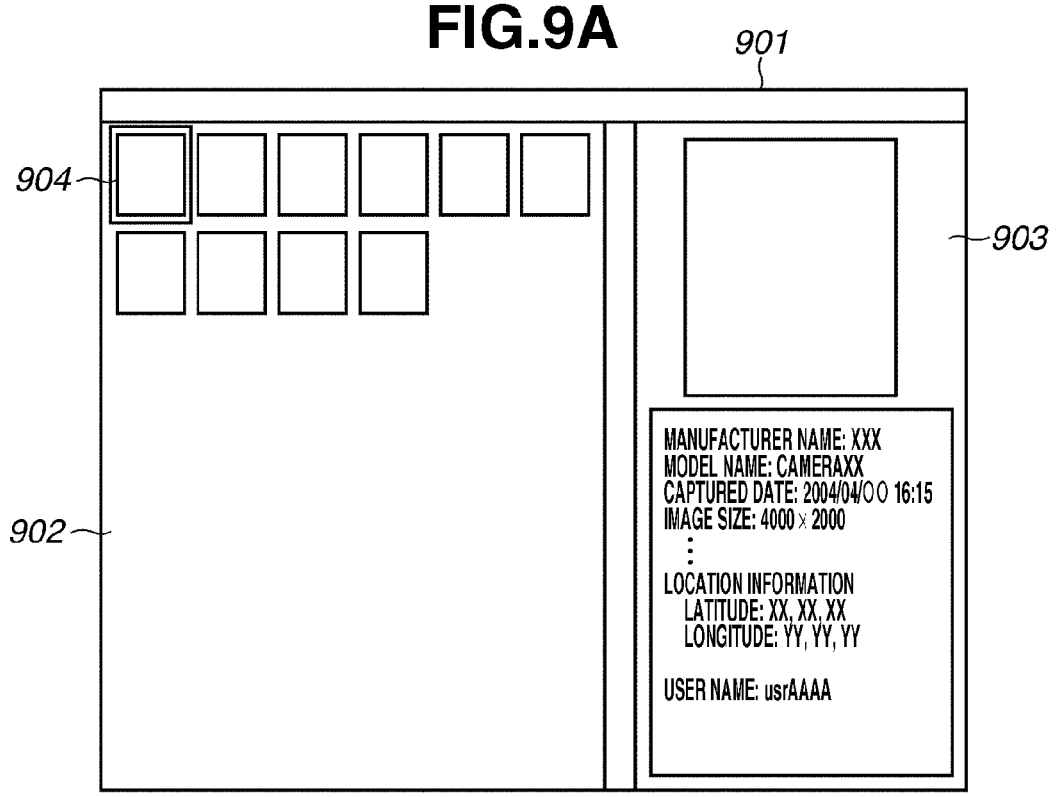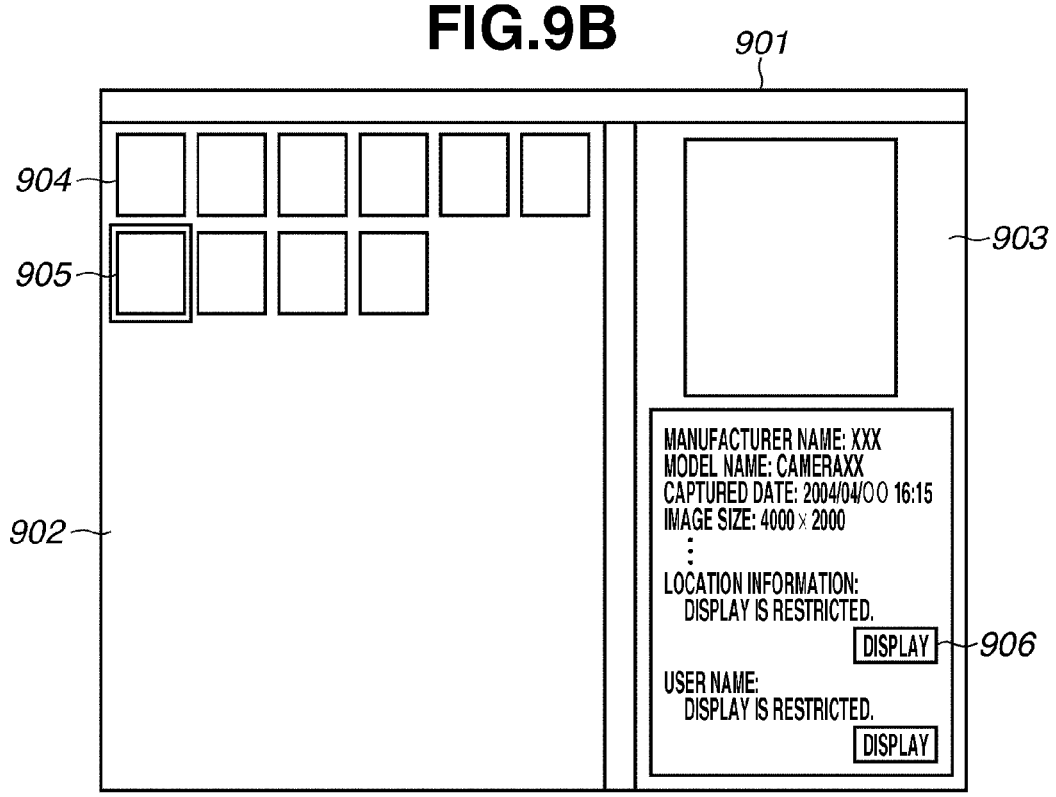

FIG.18

| | | | |
|---|---|---|---|
| METADATA 1 | LATITUDE: XX,XX,XX LONGITUDE: YY,YY,YY | LOCATION ID: 1234 | PASSWORD 1 |
| | usrAAAA | USER ID: 5678 | |
| METADATA 2 | LATITUDE: xx,xx,xx LONGITUDE: yy,yy,yy | LOCATION ID: 1111 | |
| | 2004/01/27 | DATE ID: 2222 | PASSWORD 2 |
| | usrBBBB | USER ID: 3333 | |
| METADATA 3 | usrCCCC | USER ID: 4444 | PASSWORD 3 |

FIG.19

| METADATA 1 | 2-34, □□ 1-CHOME, △△ KU, ×× SHI, ○○ KEN | LOCATION ID: 1234 | PASSWORD 1 |
| --- | --- | --- | --- |
| METADATA OPEN TO PUBLIC 1 | △△ KU, ×× SHI, ○○ KEN | LOCATION ID: 1234 | PASSWORD 11 |
| METADATA 2 | 6-7, △△ 5-CHOME, □□ KU, ×× SHI, ○○ KEN | LOCATION ID: 1111 | PASSWORD 2 |
| | 2004 / 01 / 27 | DATE ID: 2222 | |
| METADATA OPEN TO PUBLIC 3 | □□ KU, ×× SHI, ○○ KEN | LOCATION ID: 1111 | PASSWORD 22 |
| | 2004 / 01 | DATE ID: 2222 | |

IMAGE PROCESSING APPARATUS AND CONTROL METHOD FOR DETERMINING AND ASSOCIATING PRIVATE INFORMATION WITH AN IMAGE

BACKGROUND OF THE INVENTION

1. Field of the Invention

The present invention relates to an image processing apparatus capable of associating metadata with an image.

2. Description of the Related Art

Recently, it has been widely spread that an image with location information indicating a capturing position added thereto has been opened to the general public using a web site on the Internet. However, the location information which is added to a captured image may be private information such as location information around one's own home. Therefore, for example, Japanese Patent Application Laid-Open No. 2011-120214 discusses a technique that when an image is uploaded, if location information in a range designated in advance by a user is added, the image is uploaded after deleting the location information.

However, in the above-mentioned technique, the private information is deleted, so that a user such as an owner of the private information, a family member, or friends with whom there is no problem even if the private information is open, in contrast to the other people, may not use the private information.

SUMMARY OF THE INVENTION

According to an aspect of the present invention, an image processing apparatus which is connectable with an information processing apparatus, includes an acquisition unit that acquires an image obtained by capturing an object, a unit that acquires image capturing information indicating information on capturing of the object, a determination unit that determines whether the image capturing information is private information, and an association unit that, when the determination unit determines that the image capturing information is not private information, associates the image capturing information with the image. When the determination unit determines that the image capturing information is private information, the association unit associates link information for acquiring the image capturing information based on an access condition set in the image capturing information with the image, instead of associating the image capturing information with the image.

According to the above configuration, the limitation of the use of private information may be flexibly controlled in accordance with a user.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 5 is a flowchart illustrating an operation of the image processing apparatus according to the first exemplary embodiment.

FIGS. 7A and 7B are conceptual diagrams of metadata according to the first exemplary embodiment.

FIGS. 9A and 9B are examples of a screen of the external apparatus according to the first exemplary embodiment.

FIG. 18 is a conceptual diagram of a management table of metadata according to the first exemplary embodiment.

FIG. 19 is a conceptual diagram of a management table of metadata according to the third exemplary embodiment.

DESCRIPTION OF THE EMBODIMENTS

Various exemplary embodiments, features, and aspects of the invention will be described in detail below with reference to the drawings.

Further, exemplary embodiments which will be described below are just an example as an implementation means of the present invention and may be appropriately changed or modified in accordance with a configuration of a device to which the present invention is applied or various conditions. Further, the exemplary embodiments may be appropriately combined.

Figure 1:
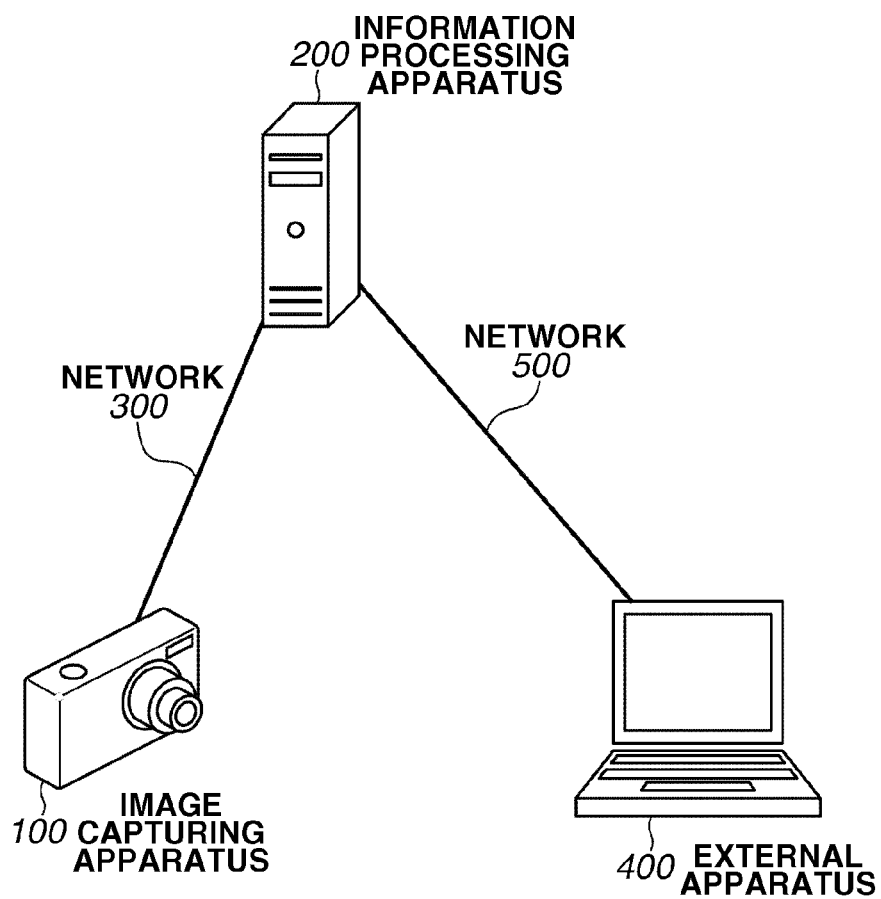
FIG. 1 is a diagram illustrating a system configuration according to a first exemplary embodiment.

FIG. 1 is a diagram illustrating a configuration example of an image processing system of a first exemplary embodiment.

Referring to FIG. 1, an image processing apparatus 100 is connected with an information processing apparatus 200 through a network 300. Further, an external apparatus 400 is connected with the information processing apparatus 200 through a network 500. In the exemplary embodiment, an example that uses a wireless LAN as the networks 300 and 500 will be described. However, a network which may be used as the networks 300 and 500 is not limited to the wireless LAN. For example, as the network 300, a network which uses infrared communication or a network which uses a Bluetooth (registered trademark) may be used. Alternatively, other wired network may be used.

Figure 2:
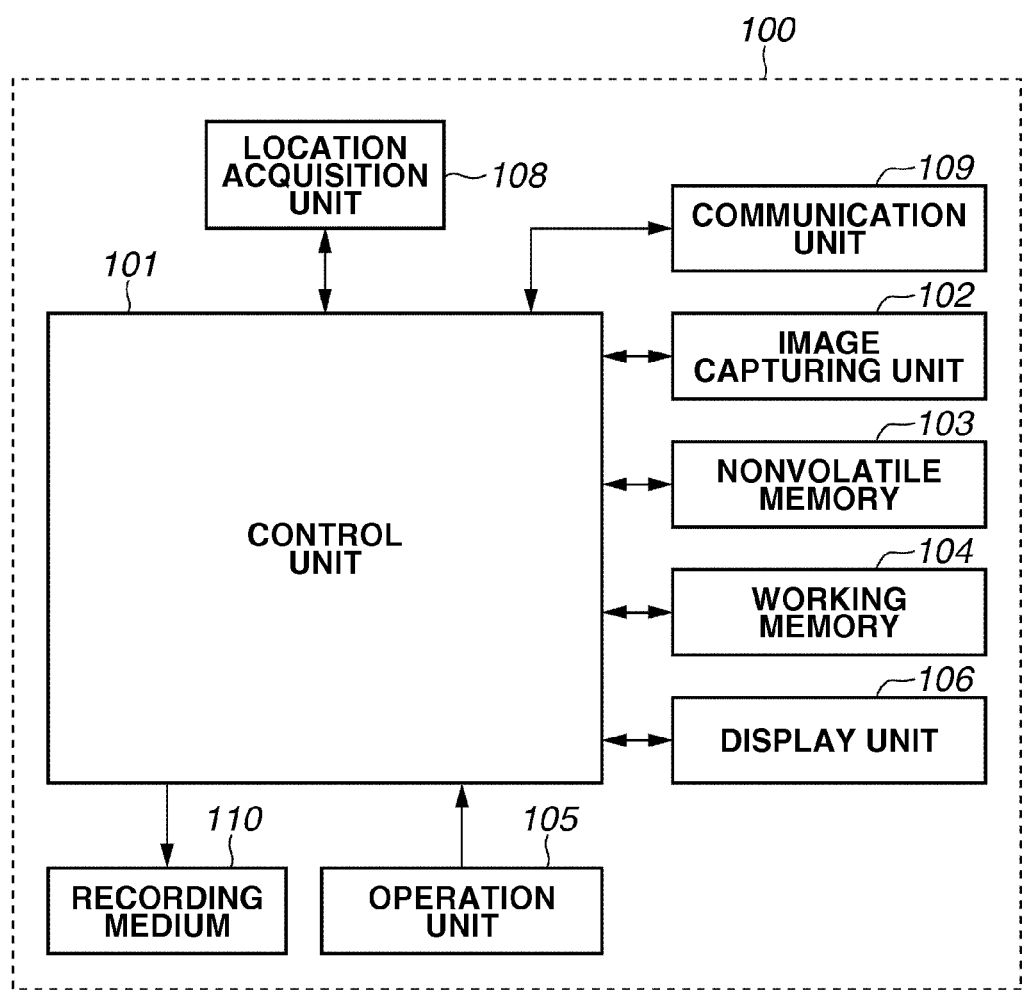
FIG. 2 is a block diagram of an image processing apparatus according to the first exemplary embodiment.

First, the image processing apparatus 100 will be described. FIG. 2 illustrates a configuration of the image processing apparatus 100. In the present exemplary embodiment, a digital camera which is an example of the image processing apparatus 100 will be described. However, the image processing apparatus 100 is not limited to the digital camera. For example, the image processing apparatus 100 may be an information processing apparatus such as a personal computer, a mobile phone, or a so-called tablet device, or an image capturing device such as a digital video camera.

A control unit 101 controls each part of the image processing apparatus 100 in accordance with an input signal or a program which will be described below. However, instead of controlling the overall device by the control unit 101, a plurality of hardware components may share the processing to control the overall device. The image processing apparatus 100 of the present exemplary embodiment has a capturing mode and a reproducing mode. In the capturing mode, the control unit 101 controls an image capturing unit 102 which will be described below to acquire image data. In the reproducing mode, the image data is viewed using a display unit 106 which will be described below.

The image capturing unit 102 performs an image capturing processing. The image capturing processing is a processing that converts object light focused by a lens included in the image capturing unit 102 into an electric signal and performs a noise reduction processing to output digital data as image data. The captured image data is stored in a buffer memory, then a predetermined operation is performed thereon by the control unit 101, and the image data is recorded in a recording medium 110.

A nonvolatile memory 103 is an electrically erasable and recordable nonvolatile memory and a program (which will be described below) to be executed in the control unit 101 is stored in the nonvolatile memory 103.

A working memory 104 is used as a buffer memory which temporarily retains image data captured by the image capturing unit 102 or an image displaying memory of the display unit 106, or a working area of the control unit 101.

An operation unit 105 is used to allow a user to instruct an operation of the image processing apparatus 100. For example, the operation unit 105 includes a power button to instruct power on/off the image processing apparatus 100 or a release switch to receive the instruction to perform image capturing processing. Further, the operation unit 105 includes operation members such as a reproducing button to view the image data, an arrow key to accept menu manipulation, and a touch panel.

The display unit 106 displays a through image at a time of capturing an image, captured image data, or a text for dialogic operations. In the present exemplary embodiment, the control unit 101 controls the image data output from the image capturing unit 102 to be continuously displayed on the display unit 106 while sequentially updating the image data as a through image. Thus, the image data captured by the image capturing unit 102 is sequentially displayed on the display unit 106 in real time. Further, the image processing apparatus 100 does not necessarily need to include the display unit 106, but at least may be connected to the display unit 106 and have a display control function which controls the display of the display unit 106.

A location acquisition unit 108 performs positioning processing. The positioning processing is processing which receives a signal from a global positioning system (GPS) satellite and acquires location information indicating a location of the location acquisition unit 108 from the received signal. In the present exemplary embodiment, the location information is displayed by coordinates of latitude and longitude. The location information is regularly acquired and recorded in the working memory 104. If the location information has been already recorded in the working memory 104, newly acquired location information is overwritten. By such processing, in the working memory 104, the latest location information is always held. Further, in the present exemplary embodiment, even though an example using the GPS is described, the location acquisition unit 108 is not limited to the GPS. For example, the location acquisition unit 108 may be an apparatus that acquire location information from an external apparatus such as a base station of cellular phones. In addition, an acceleration sensor may be used for the positioning processing.

A communication unit 109 is a connecting part to communicate with other apparatuses. The image processing apparatus 100 of the present exemplary embodiment may exchange data with the information processing apparatus 200, which will be described below, through the communication unit 109. In the present exemplary embodiment, the communication unit 109 is a wireless communication unit, and the control unit 101 can perform wireless communication with the information processing apparatus 200 through an antenna. Further, the communication unit 109 is used even when the image processing apparatus 100 accesses a network such as the Internet.

The recording medium 110 can record the image data output from the image capturing unit 102 or object information which is acquired through the communication unit 109. In the present exemplary embodiment, it is described on the basis that the image data is treated as an Exchangeable image file format (EXIF) Joint Photographic Experts Group (JPEG) image format, for example. In the EXIF JPEG image format, a thumbnail or attribute information (metadata) can be recorded in a header of the image data. Further, the recording medium 110 may be configured to be attachable to and detachable from the image processing apparatus 100 or may be mounted in the image processing apparatus 100. That is, the image processing apparatus 100 may have at least a means for accessing the recording medium 110.

The image processing apparatus 100 has been described above.

Figure 3:
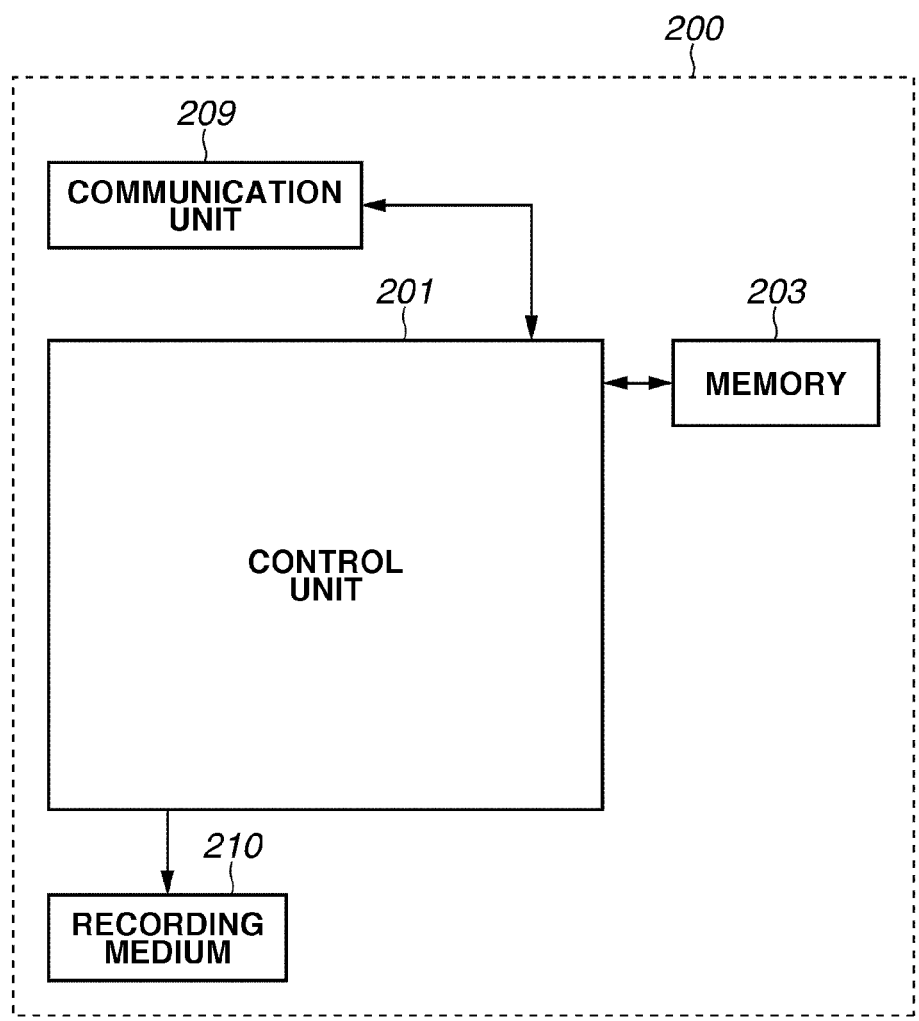
FIG. 3 is a block diagram of an information processing apparatus according to the first exemplary embodiment.

Next, the information processing apparatus 200 which can communicate with the image processing apparatus 100 will be described. FIG. 3 illustrates a configuration of the information processing apparatus 200 of the present exemplary embodiment. In the present exemplary embodiment, a server, which is an example of the information processing apparatus 200, will be described.

A control unit 201 controls each part of the information processing apparatus 200 in accordance with an input signal or a program, which will be described below. However, instead of controlling the overall apparatus by the control unit 201, a plurality of hardware may share the processing to control the overall thereof.

A memory 203 is used as a buffer memory for temporarily retaining data or a working area of the control unit 201.

A communication unit 209 is used to communicate with other apparatuses. The information processing apparatus 200 may exchange data with the image processing apparatus 100 or an external apparatus 400 through the communication unit 209.

A recording medium 210 is an electrically erasable and recordable nonvolatile recording device and various control programs or OS (operating system) to be executed by the control unit 201 are recorded in the recording medium 210. Further, information acquired through the communication unit 209 can be recorded in the recording medium 210. The recording medium 210 may be separate from the information processing apparatus 200 or the information processing apparatus 200 may include the recording medium 210. In other words, the information processing apparatus 200 may have at least a means for accessing the recording medium 210.

The information processing apparatus 200 which can communicate with the image processing apparatus 100 has been described above.

Figure 4:
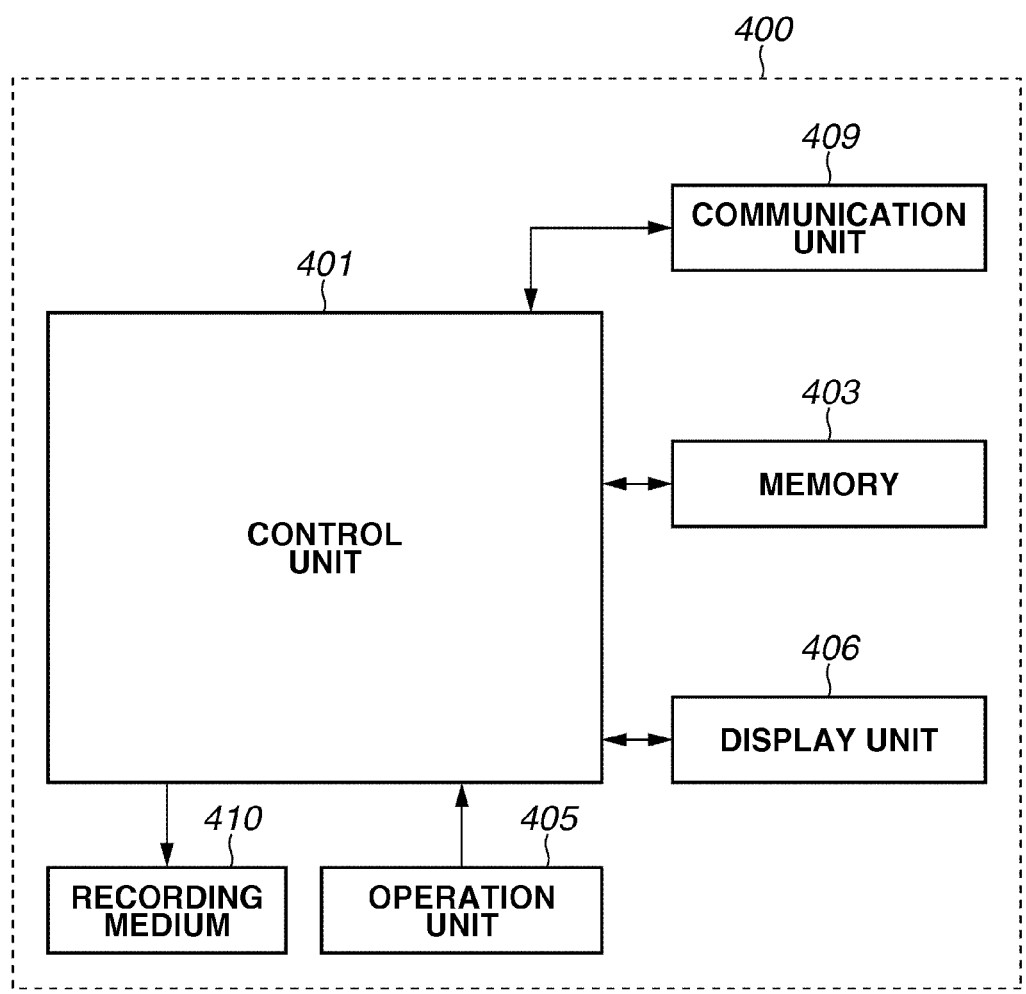
FIG. 4 is a block diagram of an external apparatus according to the first exemplary embodiment.

Next, the external apparatus 400 which can communicate with the information processing apparatus 200 will be described. FIG. 4 illustrates a configuration of the external apparatus 400 of the present exemplary embodiment. In the present exemplary embodiment, a personal computer which is an example of the external apparatus 400 will be described. However, the external apparatus 400 is not limited to the personal computer. For example, the external apparatus 400 may be a digital camera, a mobile phone, or so-called tablet device.

The external apparatus 400 includes a control unit 401, a memory 403, a communication unit 409, and a recording medium 410. These components are similar to those of the information processing apparatus 200, so that the description thereof will be omitted.

An operation unit 405 is used to instruct an operation of the external apparatus 400 by a user. For example, the operation unit 405 includes operation members such as a mouse, a keyboard, or a touch panel.

A display unit 406 displays a text for a dialogic operation. Further, the external apparatus 400 does not need to include the display unit 406, but at least can be connected to the display unit 406 and have a display control function which controls the display of the display unit 406.

The external apparatus 400 which can communicate with the information processing apparatus 200 has been described above.

In the present exemplary embodiment, a scene where the image processing apparatus 100 and the information processing apparatus 200 cooperate with each other to generate an image and the image is viewed through the external apparatus 400 which copies the image will be described as an example.

First, the processing in which the image processing apparatus 100 and the information processing apparatus 200 cooperate with each other to generate an image will be described.

First, an operation of the image processing apparatus 100 in the present exemplary embodiment will be described. FIG. 5 is a flowchart illustrating an operation of the image processing apparatus 100 at the time of capturing an image. Each processing illustrated in the flowchart will be implemented when the control unit 101 loads the program stored in the nonvolatile memory 103 into the working memory 104, and controls each unit of the image processing apparatus 100 in accordance with the program. In addition, the processing illustrated in the flowchart starts when it is determined that the control unit 101 receives the instruction to perform the image capturing processing. The same applies to a flowchart illustrating subsequent processing performed by the image processing apparatus 100. In addition, it is assumed that the image processing apparatus 100 and the information processing apparatus 200 are connected in advance before starting the processing of the flowchart.

First, in step S501, the control unit 101 performs the image capturing processing. With this processing, the image capturing processing is performed and an image is acquired.

Next, in step S502, the control unit 101 reads out the metadata to be added to the image acquired in step S501. For example, to acquire the location information, the control unit 101 reads out the latest location information from the working memory 104. Alternatively, for example, to acquire a user name, the control unit 101 reads out a user name which user records in advance in the nonvolatile memory 103 by operating a menu. The metadata acquired herein is an example of image capturing information.

Next, in step S503, the control unit 101 determines whether the metadata acquired in step S502 is private information. This determination is performed for each item such as location information, date information, or a user name. Further, it is assumed that conditions for the determination are set in advance before starting the processing of the flowchart.

Figure 6A:
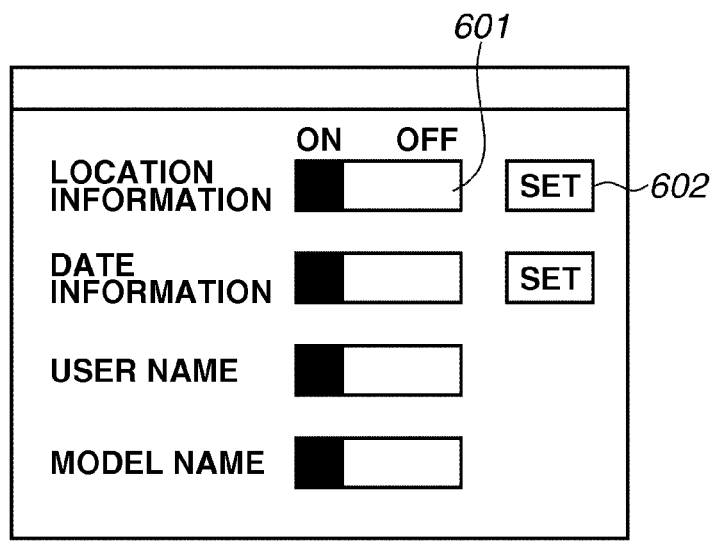
FIGS. 6A and 6B are examples of a setting screen according to the first exemplary embodiment.

Here, setting of the condition regarding the determination will be described. FIG. 6A is an example of a setting screen regarding the determination on whether the metadata is private information, which is displayed through the operation of a menu by the user. In FIG. 6A, a switch 601 for the location information, the date information, the user name, and a model name is displayed. The user operates the switch 601 through the operation unit 105 to set ON/OFF of a determining function, which determines whether the metadata is private information, for each item. For an item whose determining function is ON, it is determined that the private information is likely to be included to determine whether the information is private information. For an item whose determining function is OFF, it is not determined whether the information is private information. Further, as for the location information and the date information, the user selects a setting button, which is displayed around the switch 601, to set more conditions regarding the determination.

Figure 6B:
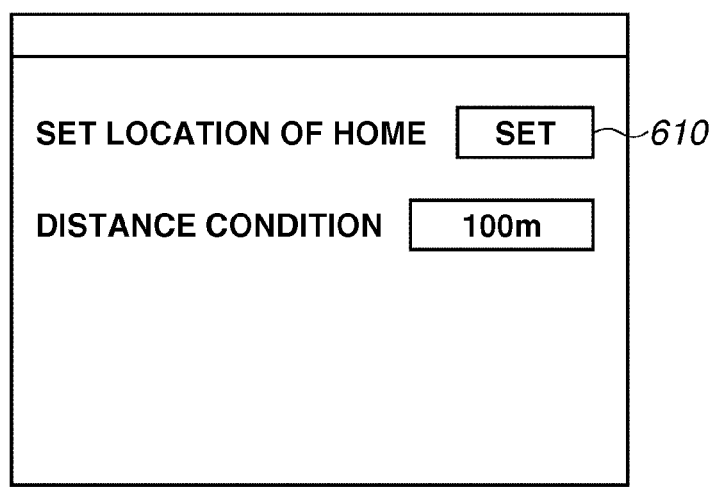

For example, if a setting button 602 corresponding to the item of the location information is selected, a screen of FIG. 6B is displayed. The screen of FIG. 6B is a screen for setting a condition for determining that the location information is private information. In the present exemplary embodiment, an example will be described, in which location information indicating a location, which is within a predetermined distance from the location of the user's home, is exemplified as private information. In the screen of FIG. 6B, the user selects a button 610 for registering a location of the home to register the present location as the location of the home. With this operation, the user selects the button 610 in the home to register the location of the home in the image processing apparatus 100 in advance. The location information indicating the registered location of the home is recorded in the nonvolatile memory 103. Further, the user designates a distance from the location of the home to set a range of a distance from the location of the home as the private information. In an example of FIG. 6B, it is determined that the location information indicating that a range of the distance from the location of the home is within 100 m is private information. In order to set the distance, for example, a method of selecting a distance from some options which is displayed on a pull-down menu or a method of inputting the distance using a software keyboard can be used. Here, even though an example of selecting a distance from the home is described, the distance may be set as a fixed value in advance. Further, it may be determined whether to be the private information using the range of the area where the home is located by storing range data of an area. As for the date information, similarly, a condition for the determination can be set. For example, it is possible to set date information indicating any time within a predetermined time duration as the private information. Further, setting buttons for the user name and the model name are not displayed.

The setting of the condition for determining the private information has been described above. The conditions set in FIGS. 6A and 6B are examples of a determination criterion.

In step S503, the control unit 101 determines whether the metadata acquired in step S502 is the private information in accordance with a predetermined condition. For example, a case where the function of determining that the location information is the private information is ON in advance and the distance from the location of the home is set to be 100 m will be described. In this case, the control unit 101 compares the location information acquired in step S502 with the predetermined location of the home. As a result of the comparison, if the distance between the locations indicated by the location information is within a predetermined distance (100 m in this example), the location information acquired in step S502 is assumed to indicate the location when an image is captured at a location close to the location of the home. Therefore, in this case, the control unit 101 determines that the location information acquired in step S502 is the private location information. On the other hand, as a result of the comparison, if the distance between the locations indicated by the location information is the predetermined distance or farther, the control unit 101 determines that the location information acquired in step S502 is not the private location information. This is because the location information acquired in step S502 indicates the location far from the home. Further, for example, if the function of determining that the user name is the private information is set to be ON in advance, the control unit 101 determines that the user name is the private information. The result determined here is temporarily stored in the working memory 104. For example, a flag is added to an item which is determined to be the private information. If the determination for all of the items is completed, the processing proceeds to step S504.

In step S504, the control unit 101 refers to the determination result stored in the working memory 104 in step S503 to determine whether the metadata acquired in step S502 includes private information. For example, if the flag is added to the item of the metadata, the control unit 101 determines that the metadata includes the private information.

In step S504, if the control unit 101 determines that the metadata acquired in step S502 does not include the private information (No in step S504), the processing proceeds to step S505.

In step S505, the metadata acquired in step S502 is added to the image. Specifically, the metadata is recorded in a header area of the image in accordance with the EXIF standard. FIG. 7A is a conceptual diagram of a part of the header area of the image. In FIG. 7A, various kinds of information such as a manufacturer name, a model name, a captured date, or a user name is recorded in the image as metadata. Each item of the metadata which is added here is recorded in a format which is generally usable. As described above, if the metadata does not include the private information, the metadata is recorded in a format which is capable of being used by a general public when the image is open to public.

On the other hand, in step S504, if the control unit 101 determines that the metadata acquired in step S502 includes the private information (Yes in step S504), the processing proceeds to step S506. In the present exemplary embodiment, an example when among the items of the metadata, the location information and the user name are determined to be the private information will be described.

In step S506, the control unit 101 transmits a copy of an item of the metadata, which is determined to be the private information in step S504, to the information processing apparatus 200 through the communication unit 109. Further, a password, which is set in advance by the user of the image processing apparatus 100 through the operation of the menu, is also transmitted together with the copy of the item of the metadata. The transmitted password is stored in the recording medium 210 of the information processing apparatus 200 so as to be associated with the location information which is transmitted together. The password is used to control the limitation on access to the private metadata, which will be described when the access to the image will be described below. Further, the password is an example of an access condition.

Continuously, in step S507, the control unit 101 receives a response to the metadata transmitted in step S506 from the information processing apparatus 200 through the communication unit 109. This response includes an ID corresponding to each item of the metadata transmitted in step S506. In the present exemplary embodiment, a location ID corresponding to the location information and a user ID corresponding to the user name are included. These IDs are generated in the information processing apparatus 200. The generation of the IDs will be described when the operation of the information processing apparatus 200 will be described below.

In step S508, the control unit 101 adds metadata, which is determined not to be the private information in step S504, to the image and records the ID received in step S507 and an address of the information processing apparatus 200 in the header area of the image as link information. Further, the address of the information processing apparatus 200 is recorded in the nonvolatile memory 103 in advance. FIG. 7B is a conceptual diagram of a part of the header area of the image similar to FIG. 7A. In the example of FIG. 7B, different from FIG. 7A, the location information and the user name acquired in step S502 are not recorded. Instead thereof, an address 703 of the information processing apparatus 200, a location ID 704, and a user ID 705 are recorded in an area of a manufacturer's note as the link information. When the metadata of the image to which the link information is added is viewed, the user needs to refer to the link information to acquire the metadata from the information processing apparatus 200. As described above, when the metadata is acquired, the password, which is determined in advance by the user of the image processing apparatus 100, needs to be input. As described above, the accessing to the private information is controlled by distinguishing a user who knows the password from a user who does not know the password. The accessing will be described in detail below. Thereafter, the processing ends.

The operation of the image processing apparatus 100 has been described above.

Figure 8:
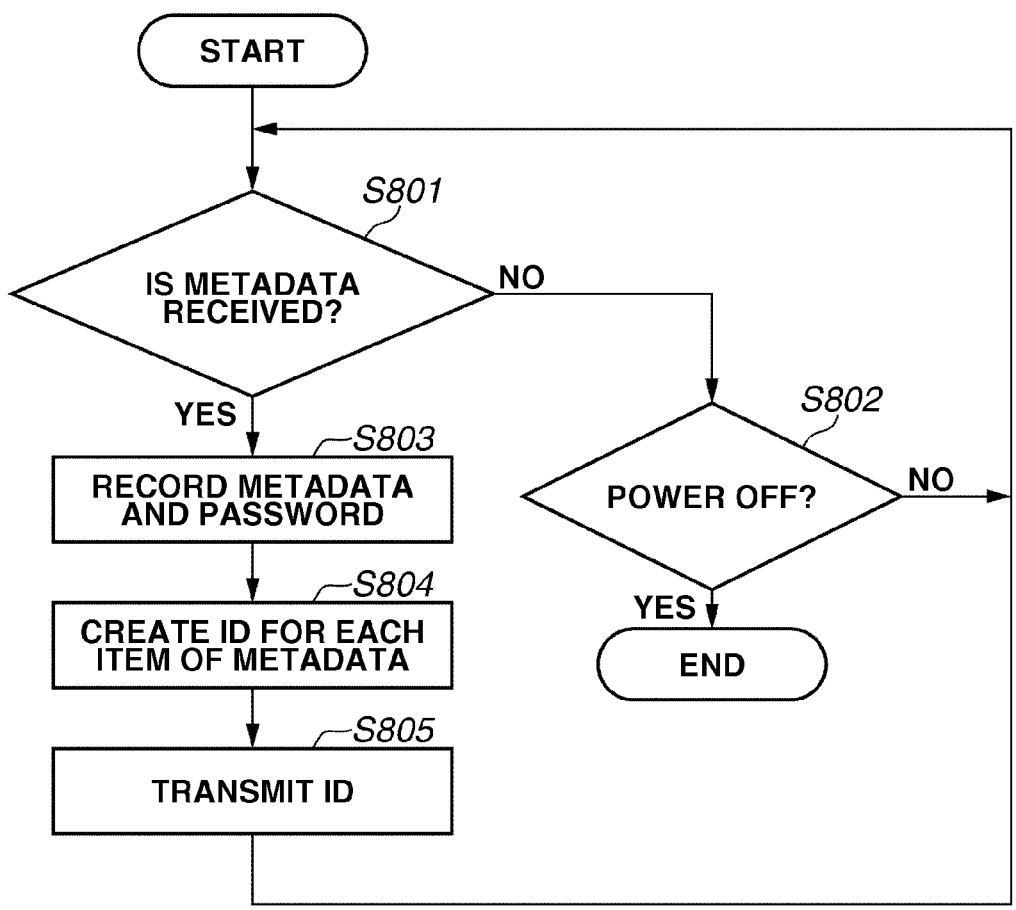
FIG. 8 is a flowchart illustrating an operation of the information processing apparatus according to the first exemplary embodiment.

Next, an operation of the information processing apparatus 200 corresponding to the operation of the image processing apparatus 100 will be described. FIG. 8 is a flowchart illustrating an operation of the information processing apparatus 200. Each processing illustrated in the flowchart is implemented when the control unit 201 loads a program stored in the recording medium 210 into the memory 203, and controls each unit of the information processing apparatus 200 in accordance with the program. Further, the processing illustrated in the flowchart, for example, starts when the power of the information processing apparatus 200 is turned on. The same applies to a flowchart illustrating subsequent processing performed by the information processing apparatus 200.

First, in step S801, the control unit 201 determines whether the metadata is received from the image processing apparatus 100. Here, the metadata transmitted from the image processing apparatus 100 is metadata which has been transmitted in step S506 of FIG. 5. If it is determined that the control unit 201 does not receive the metadata (No in step S801), the processing proceeds to step S802. In step S802, the control unit 201 determines whether an instruction to turn off the power is received. If it is determined that the control unit 201 receives the instruction to turn off the power (Yes in step S802), the processing of the flowchart ends. On the other hand, if it is determined that the control unit 201 does not receive the instruction to turn off the power (No in step S802), the processing returns to step S801.

In step S801, if it is determined that the control unit 201 receives the metadata (Yes in step S801), the processing proceeds to step S803. Further, when the metadata is received, the transmitted password is received together with the metadata.

In step S803, the control unit 201 records the received metadata in the recording medium 210 together with the received password.

Continuously, in step S804, the control unit 201 generates a unique ID for each item of the received metadata and associates the unique ID with each of the items of the received metadata and stores it in the recording medium 210. With this operation, each of the items of the metadata, the ID corresponding to each of the items, and the password corresponding to the metadata are associated with each other. FIG. 18 illustrates a conceptual diagram of a management table of the metadata managed by the information processing apparatus 200 of the present exemplary embodiment. In the present exemplary embodiment, as illustrated in FIG. 18, a password is associated with each set of the metadata added to an image, and the ID is associated with each item of the metadata. Further, each of the IDs includes information indicating that the ID is for which item of the metadata.

Next, in step S805, the control unit 201 transmits an ID corresponding to each of the items of the metadata to the image processing apparatus 100 as a response to the metadata received from the image processing apparatus 100. The transmitted ID here is to be added to the image as link information in step S508 of FIG. 5. Thereafter, the processing returns to step S801.

The operation of the information processing apparatus 200 has been described above.

Processing in which the image processing apparatus 100 cooperates with the information processing apparatus 200 to generate an image has been described above. In this way, an image to which the link image is added is generated in the image processing apparatus 100 and the private metadata is managed in the information processing apparatus 200.

Next, processing when another user accesses the image to which the link information generated as described above is added will be described. For the description, in the present exemplary embodiment, a scene where an image to which link information including a location ID and a user ID is added is copied to the external apparatus 400 with a predetermined method and the user of the external apparatus 400 views the image to which the link information is added will be described as an example. A method of copying the image to which the link information is added from the image processing apparatus 100 to the recording medium 410 of the external apparatus 400 is not specifically limited. For example, a method of copying the image through an on-line album or an image sharing site or a method of copying the image by borrowing or lending an attachable recording medium between users can be used. Further, it is assumed that a viewer application for viewing the image is installed in the external apparatus 400 in advance.

FIGS. 9A and 9B are examples of a screen displayed on the display unit 406 of the external apparatus 400 on which the viewer application is operating. In FIGS. 9A and 9B, on a display area 902 of a window 901, a list of thumbnails of images read out from the recording medium 410 is displayed. The user of the external apparatus 400 can select these images through the operation unit 405. On the display area 903, an image corresponding to a selected thumbnail and metadata are displayed. In an example of FIG. 9A, an image 904 is selected and metadata of the image 904 is displayed on the display area 903. In the header area of the image 904, for example, the location information is added as metadata as illustrated in FIG. 7A and on the display area 903, the latitude and longitude, which are location information, are displayed. Further, in the image 904, the user name is added as metadata and the user name is also displayed on the display area 903. On the other hand, in an example of FIG. 9B, an image 905 is selected and metadata of the image 905 is displayed on the display area 903. In the header area of the image 905, the location information or the user name is not added as illustrated in FIG. 7B, but the link information is added. In other words, the location information indicating the captured location of the image 905 or the user name are information determined as private information. Therefore, instead of displaying the location information or the user name, a message indicating that access is restricted and buttons 906 and 907 for displaying the private information are displayed. The user selects the button 906 or 907 through the operation unit 405 to acquire and display the private information from the information processing apparatus 200.

Figure 10:
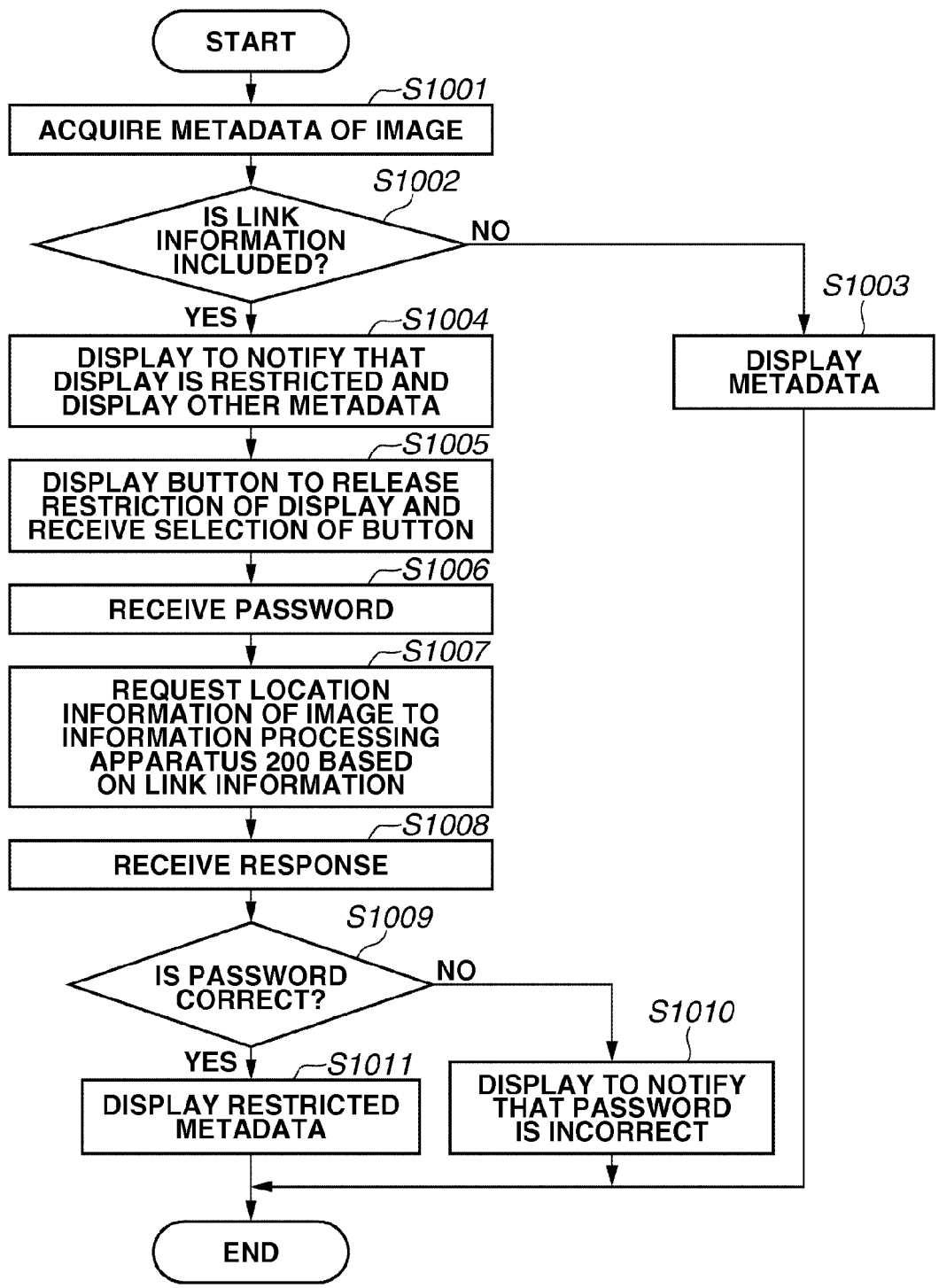
FIG. 10 is a flowchart illustrating an operation of the external apparatus according to the first exemplary embodiment.

FIG. 10 is a flowchart illustrating an operation of the external apparatus 400 on which the viewer application is running. The processing illustrated in the flowchart start, for example, when the external apparatus 400 on which the viewer application is running receives the instruction to select an image and is implemented when the control unit 401 controls each unit of the external apparatus 400 in accordance with the OS and the viewer application. The same applies to a flowchart illustrating subsequent processing executed by the external apparatus 400.

First, in step S1001, the control unit 401 acquires metadata of a designated image. Specifically, a header area of the indicated image is read into the memory 403.

Next, in step S1002, the control unit 401 determines whether the link information is included in the acquired metadata. Specifically, the control unit 401 refers to an area of the manufacturer's note of the metadata to determine whether the address of the information processing apparatus 200 is recorded.

First, a case when the control unit 401 determines that the link information is not included in the metadata will be described. In this case (No in step S1002), the processing proceeds to step S1003.

In step S1003, the control unit 401 displays the metadata on the screen together with the image. As a result, for example, as illustrated in FIG. 9A, the location information of the image and the user name is displayed on the display area 903. Thereafter, the processing ends.

Next, a case where the control unit 401 determines in step S1002 that the link information is included in the metadata, will be described. In this case (Yes in step S1002), the processing proceeds to step S1004.

In step S1004, the control unit 401 refers to the link information but does not display the private metadata among the items of the metadata. Instead, it is notified that the access to the item of the private metadata is restricted.

Next, in step S1005, the control unit 401 displays a button for displaying the private information so as to be selectable and receives the selection of the button. As a result of performing the processing of steps S1004 and S1005, for example, a screen as illustrated in FIG. 9B is displayed. In the screen of FIG. 9B, access to the location information and the user name is restricted. The user selects the button 906 through the operation unit 405 to input an instruction to display the location information. Further, the user selects the button 907 through the operation unit 405 to input an instruction to display the user name. In other words, the instruction can be individually input to each item of the metadata whose access is restricted. Hereinafter, a case where the instruction to display the location information is input will be described as an example.

Figure 11A:
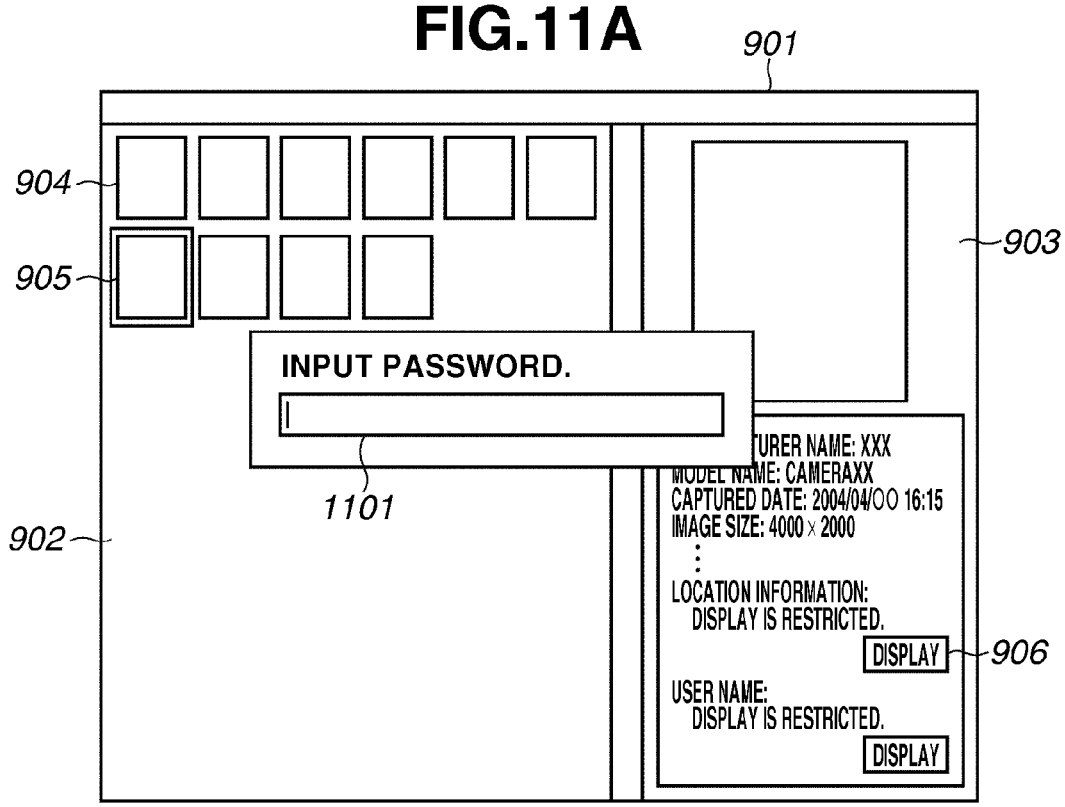
FIGS. 11A, 11B, and 11C are examples of a screen of the external apparatus according to the first exemplary embodiment.

In step S1005, if the control unit 401 detects the selection of the button 906, subsequently, the control unit 401 receives the input of the password in step S1006. Specifically, the control unit 401, for example, displays a dialogue 1001 for receiving the input of the password, as illustrated in FIG. 11A. Further, in the example of FIG. 11, the same configuration as that of FIG. 9 is denoted by the same reference numeral. The user may input a password in an input area of the dialogue 1001 through the operation unit 405.

If the password is input, subsequently, in step S1007, the control unit 401 accesses a connection destination based on the link information. Specifically, the control unit 401 refers to an address, which is included in the link information, to establish the communication with the information processing apparatus 200. Then, the control unit 401 transmits a request for a captured location of the indicated image to the information processing apparatus 200. This request includes the location ID and the password received in step S1006. With respect to the request, the information processing apparatus 200 returns the response based on the received ID and password to the external apparatus 400.

Next, in step S1008, the control unit 401 receives the response with respect to the transmitted request from the information processing apparatus 200.

In step S1009, the control unit 401 determines whether the response is a response indicating that the password is incorrect or information indicating that the password is correct. If the control unit 401 determines that the response is the response indicating that the password is incorrect (No in step S1009), the processing proceeds to step S1010.

Figure 11B:
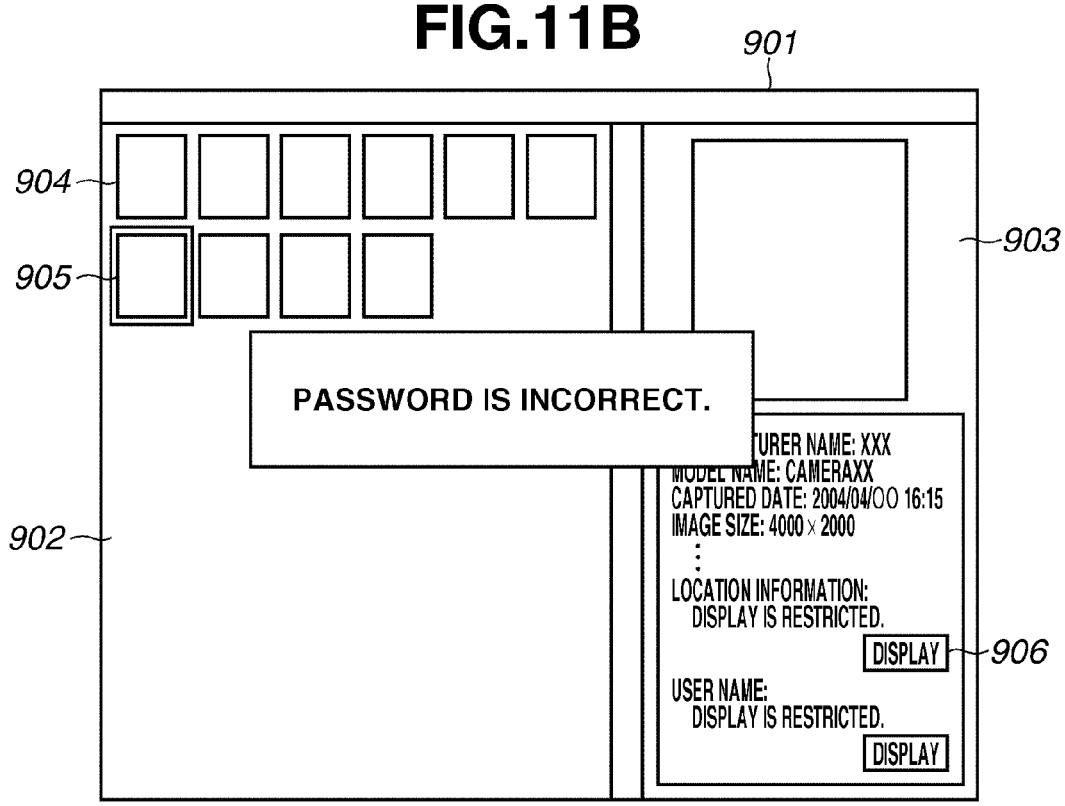

In step S1010, the control unit 401 notifies the user that the password is incorrect. For example, a screen as illustrated in FIG. 11B is displayed. In other words, the location information is not displayed on the display area 903. Then, the processing ends.

On the other hand, in step S1009, if the control unit 401 determines that the response received in step S1008 is a response indicating that the password is correct (Yes in step S1009), the processing proceeds to step S1011.

Figure 11C:
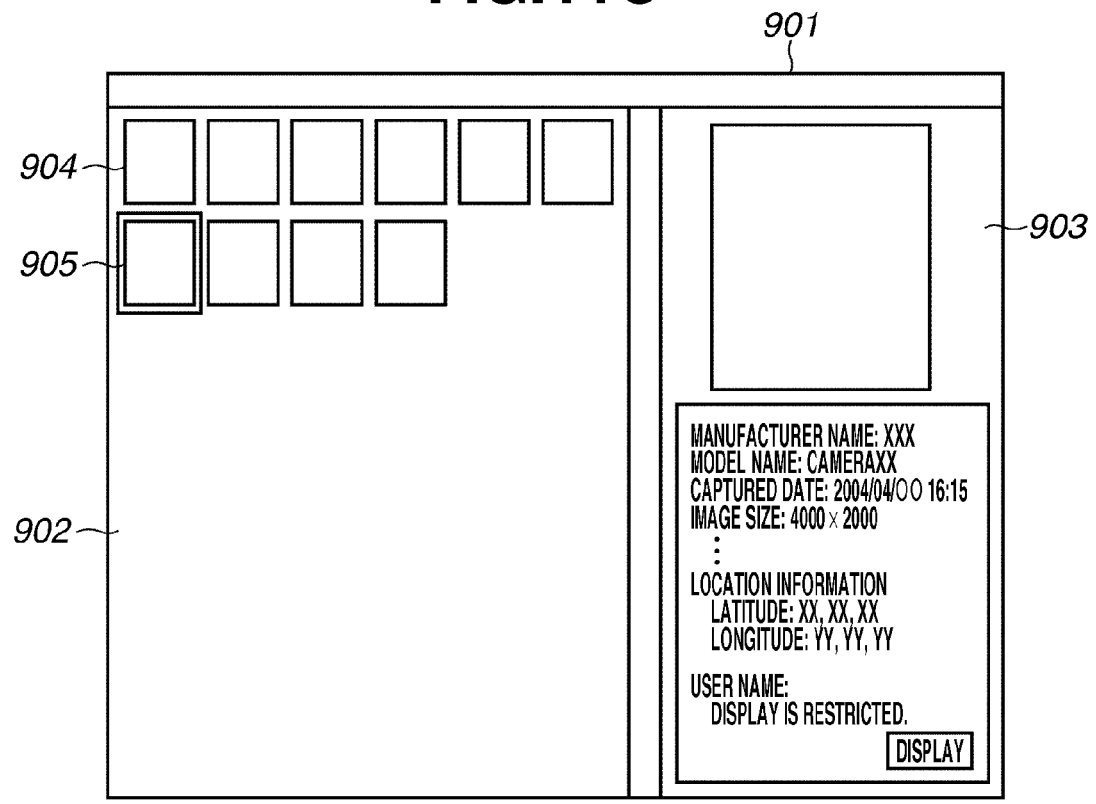

In step S1011, the control unit 401 displays the location information included in the received response as the location information indicating the captured location of the indicated image on the screen. As a result, the screen as illustrated in FIG. 11C is displayed. That is, the requested location information is displayed. Then, the processing of the flowchart ends.

The operation of the external apparatus 400 in the present exemplary embodiment has been described above. Though an example of the location information has been described, the restriction on display can be released with the similar processing even when other information is restricted to be displayed.

Figure 12:
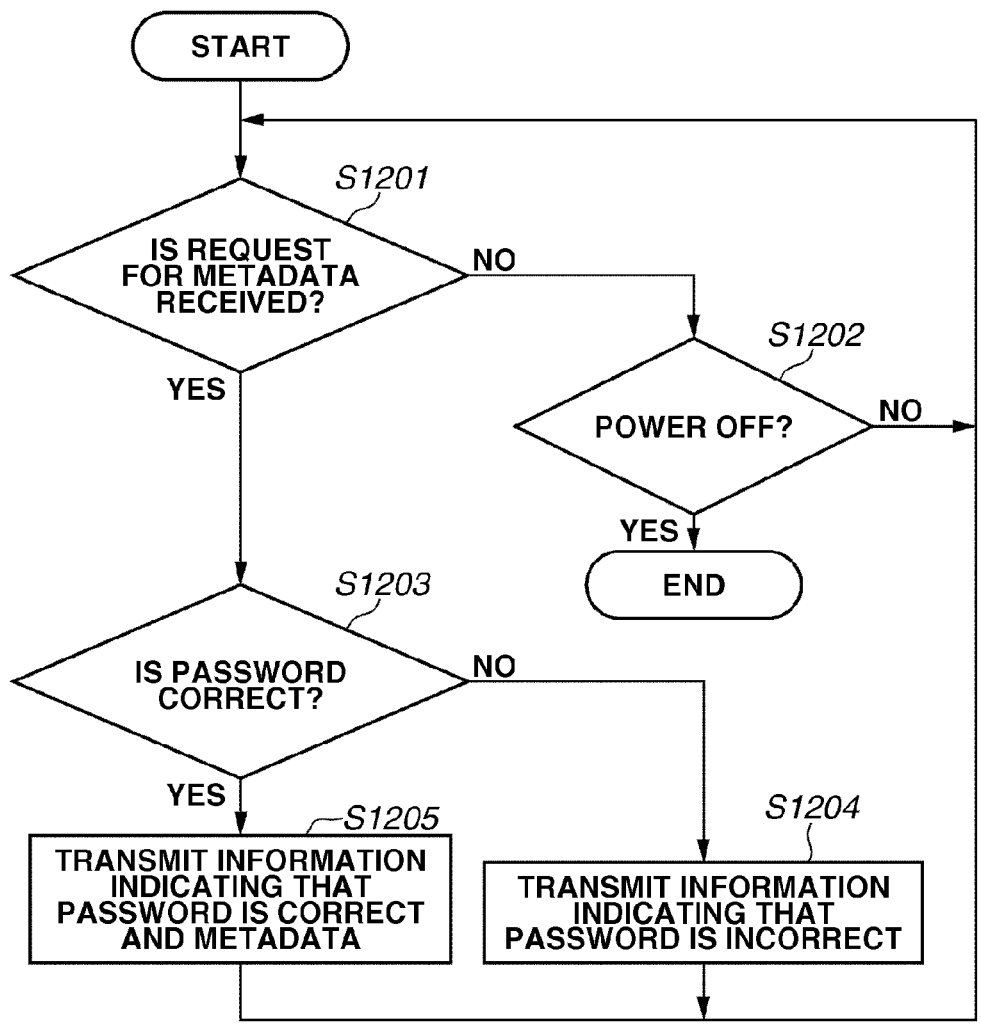
FIG. 12 is a flowchart illustrating an operation of the information processing apparatus according to the first exemplary embodiment.

Next, an operation of the information processing apparatus 200 corresponding to the operation of the external apparatus 400 will be described. FIG. 12 is a flowchart illustrating an operation of the information processing apparatus 200. The processing illustrated in the flowchart is performed in parallel with the processing illustrated in FIG. 8.

First, in step S1201, it is determined whether a request for metadata is received from the external apparatus 400. If the control unit 201 determines that the request is not received (No in step S1201), the processing proceeds to step S1202. In step S1202, the control unit 201 determines whether an instruction to turn off the power is received. If the control unit 201 determines that the instruction to turn off the power is received (Yes in step S1202), the processing of the flowchart ends. On the other hand, if the control unit 201 determines that the instruction to turn off the power is not received (No in step S1202), the processing returns to step S1201.

In step S1201, if the control unit 201 determines that the request is received (Yes in step S1201), the processing proceeds to step S1203.

In step S1203, the control unit 201 determines whether the password included in the request is correct. Specifically, the control unit 201 refers to the ID included in the request received in step S1201 to read out the corresponding password from the recording medium 210 and compares the password with a password included in the request received in step S1201. As a result of the comparison, if the passwords match each other, the control unit 201 determines that the input password is correct. If the passwords do not match each other, the control unit 201 determines that the input password is incorrect.

In step S1203, if the control unit 201 determines that the password is incorrect (No in step S1203), the processing proceeds to step S1204.

In step S1204, the control unit 201 transmits information indicating that the password is incorrect to the external apparatus 400. Thereafter, the processing ends.

On the other hand, in step S1203, if the control unit 201 determines that the password is correct (Yes in step S1203), the processing proceeds to step S1205.

In step S1205, the control unit 201 reads out metadata corresponding to the ID included in the request received in step S1201 from the recording medium 210 and transmits the metadata to the external apparatus 400 together with information indicating that the password is correct. Then, the processing ends.

The operation of the corresponding information processing apparatus 200 has been described above.

As described above, in the image processing apparatus 100 of the present exemplary embodiment, the private metadata is not directly recorded in the image but managed in the information processing apparatus 200. Further, in order to acquire the private information based on the link information, the password needs to be input. That is, in order to access the private metadata, a person who attempts access needs to know the password. With this configuration, since it is possible to distinguish whether the user is permitted to access the private metadata, it is possible to control the open of the private metadata to public corresponding to the user.

Further, the image and the private metadata are separately treated. Thus, the disclosure of metadata to the public can be restricted while the image is released to public. Further, the metadata may be restricted to be available to the public without limiting a means for opening the image to the public.

In the first exemplary embodiment, an example has been described, in which, in a state where the communication with the information processing apparatus 200 is established, the image capturing processing is performed in the image processing apparatus 100 and the private information is transmitted to the information processing apparatus 200. On the other hand, in a second exemplary embodiment, an example will be described, in which processing of establishing the connection with the information processing apparatus 200 is performed as the metadata is determined as the private information. Further, since the present exemplary embodiment has a lot of common parts with the first exemplary embodiment, the description of the common parts will be omitted but specific parts of the present exemplary embodiment will be mainly described.

Figure 13:
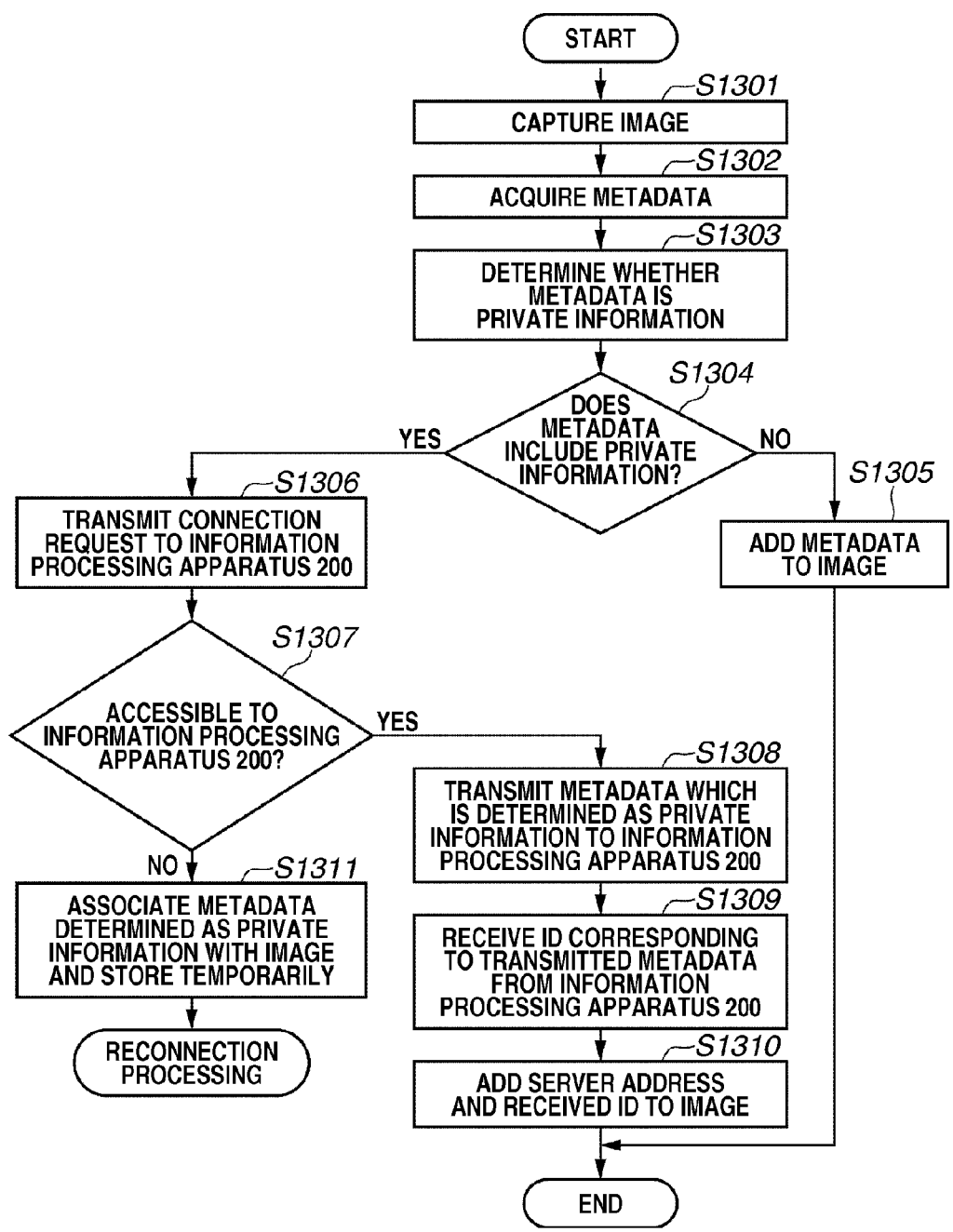
FIG. 13 is a flowchart illustrating an operation of an image processing apparatus according to a second exemplary embodiment.

FIG. 13 is a flowchart illustrating an operation of the image processing apparatus 100 at the time of capturing an image.

Steps S1301 to S1305 perform similar processing as steps S501 to S505 of FIG. 5.

In step S1304, when the control unit 101 determines that the metadata includes the private information (YES in step S1304), the processing proceeds to step S1306.

In step S1306, the control unit 101 tries to establish the communication with the information processing apparatus 200. Specifically, the control unit 101 refers to the address of the information processing apparatus 200 recorded in the nonvolatile memory 103 to transmit a connection request to the information processing apparatus 200. The information processing apparatus 200 transmits a connection permission signal to the image processing apparatus 100 in response to the request. When the connection permission signal is received, the connection with the information processing apparatus 200 is established.

In step S1307, the control unit 101 determines whether to be accessible to the information processing apparatus 200. Specifically, the control unit 101 determines whether the response to the connection request transmitted in step S1306 is received.

If the control unit 101 determines that the response is received (Yes in step S1307), it is determined that the access to the information processing apparatus 200 is possible. In this case, the processing proceeds to step S1308. In steps S1308 to S1310, similar processing as steps S506 to S508 of FIG. 5 is performed.

On the other hand, if the response is not received even after a predetermined time has elapsed after transmitting the connection request, the control unit 101 determines that the access to the information processing apparatus 200 is impossible. In this case (No in step S1307), the processing proceeds to step S1311.

In step S1311, the control unit 101 adds an item of the metadata, which is determined not to be the private information, to the image and temporarily stores the item of the metadata in the recording medium 110. As described above, the item is recorded in the recording medium 110 once, so that it is possible to avoid a situation that the image is not stored until the connection to the information processing apparatus 200 is available. Further, an item of the metadata which is determined as the private information is associated with the image and temporarily stored it in the nonvolatile memory 103. In addition, with such association, the item of the metadata is not recorded in the header area of the image but is stored in the nonvolatile memory 103 as separate information from the image recorded in the recording medium 110. Thus, even when the image which is temporarily stored is output to the outside, it is possible to prevent the private metadata from being open to the public. Then, the processing proceeds to reconnection processing.

Figure 14:
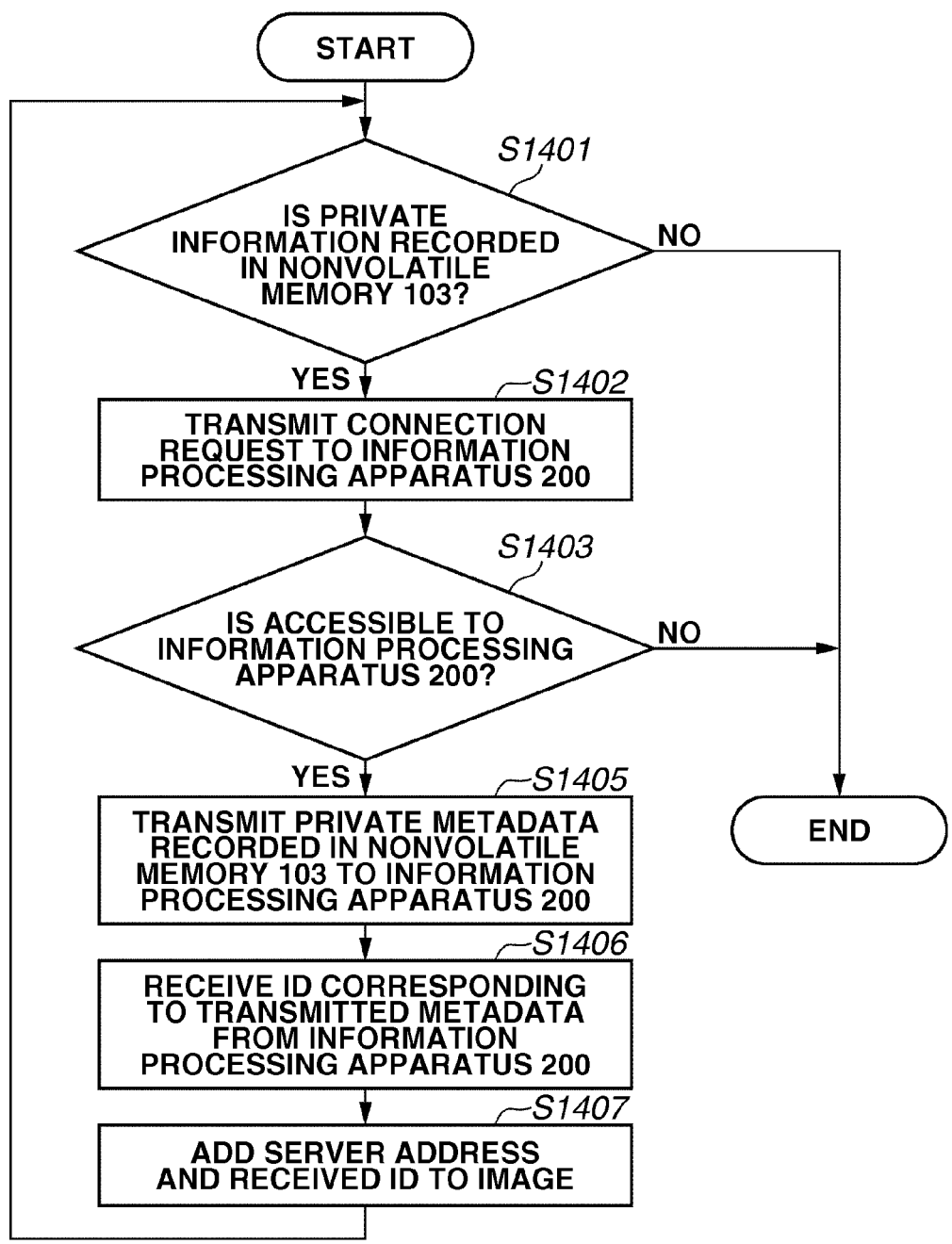
FIG. 14 is a flowchart illustrating an operation of the image processing apparatus according to the second exemplary embodiment.

Next, the reconnection processing will be described. FIG. 14 is a flowchart illustrating an operation of the image processing apparatus 100 when the reconnection processing is performed. This processing is regularly performed at a predetermined interval. However, the processing may be performed in parallel with other processing.

First, in step S1401, the control unit 101 determines whether metadata, which is determined as the private information, is stored in the nonvolatile memory 103. If it is determined that the metadata is not stored (No in step S1401), the processing of the flowchart ends.

On the other hand, if it is determined that the metadata is stored (Yes in step S1401), the processing proceeds to step S1402.

In step S1402, the control unit 101 tries to establish the communication with the information processing apparatus 200, which is similar to step S1306 of FIG. 13. Specifically, the control unit 101 refers to the address of the information processing apparatus 200 recorded in the nonvolatile memory 103 to transmit a connection request to the information processing apparatus 200.

Next, in step S1403, the control unit 101 determines whether the response to the connection request is received. If it is determined that the response is not received (No in step S1403), the processing of the flowchart ends.

On the other hand, in step S1403, if the control unit 101 determines that the response is received (Yes in step S1403), the processing proceeds to step S1405.

In step S1405, the control unit 101 transmits one of metadata recorded in the nonvolatile memory 103 to the information processing apparatus 200.

Next, in step S1406, the control unit 101 receives the response to the metadata, which is transmitted in step S506 through the communication unit 109, which is similar to step S507 of FIG. 5, from the information processing apparatus 200.

In step S1407, the control unit 101 reads out the image corresponding to the transmitted metadata from the recording medium 110 and records the address of the information processing apparatus 200 and the ID included in the response received in step S1406 in the head area of the read out image as link information. Further, among the private data which is temporarily stored in the nonvolatile memory 103, the control unit 101 deletes metadata which is transmitted to the information processing apparatus 200 in step S1405.

Then, the processing returns to step S1401 and similar processing is repeated on the remaining private metadata.

The operation of the image processing apparatus 100 in the present exemplary embodiment has been described above. The corresponding operation of the information processing apparatus 200 is similar to that in FIG. 8, so that the description thereof will be omitted.

As described above, in the present exemplary embodiment, if it is difficult to connect with the information processing apparatus 200, the image is temporarily stored. With this operation, it is possible to avoid a situation that the image is not stored in the recording medium 110 until the connection with the information processing apparatus 200 is available.

In the first exemplary embodiment, an example in which whether to open the private information to the public is set, has been described. On the other hand, in a third exemplary embodiment, an example in which the private information is open to the public at a plurality of levels, will be described. Further, since the present exemplary embodiment has a lot of common parts to the first and second exemplary embodiments, the description of the common parts will be omitted but specific parts of the present exemplary embodiment will be mainly described.

Figure 15:
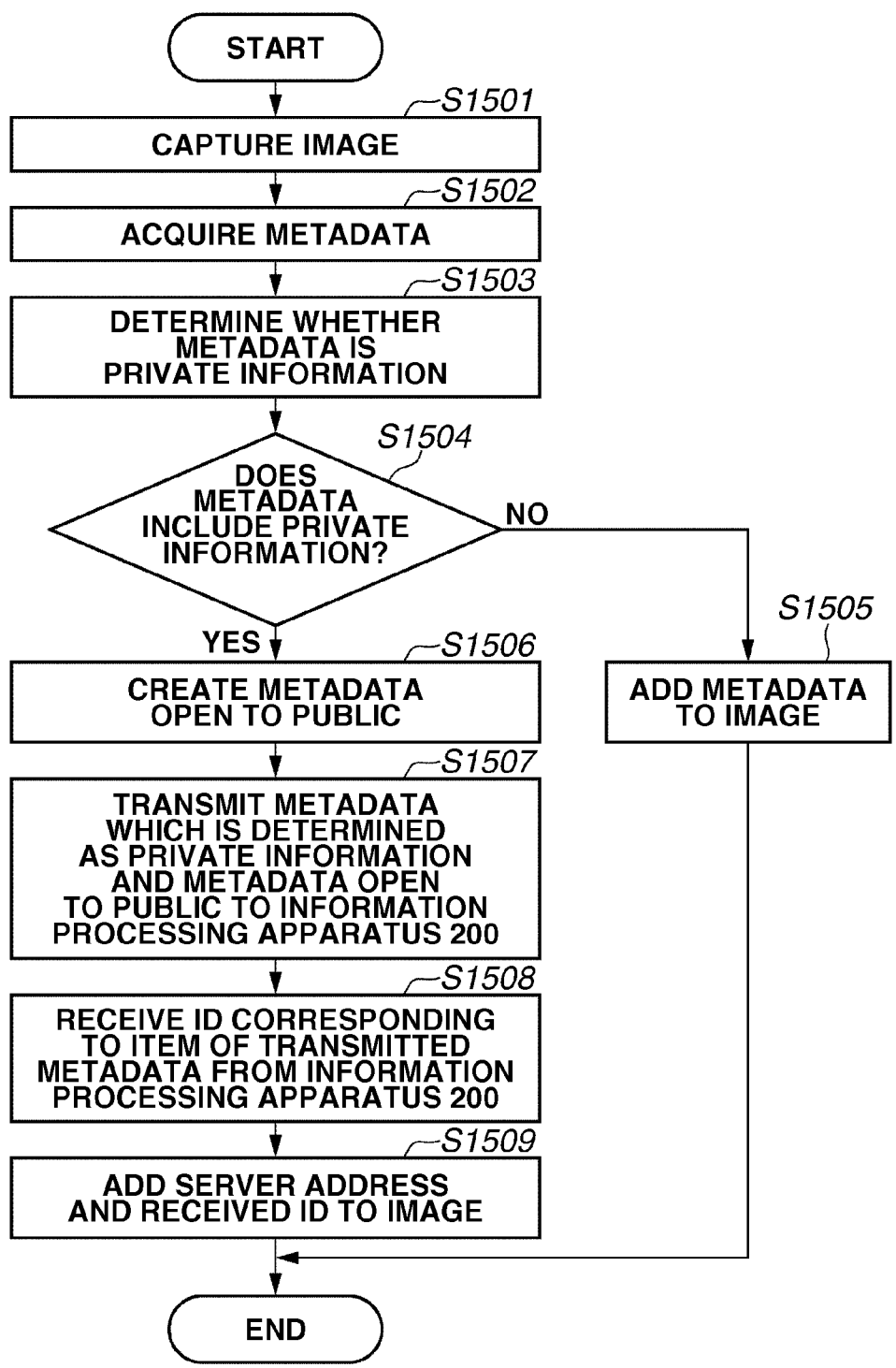
FIG. 15 is a flowchart illustrating an operation of an image processing apparatus according to a third exemplary embodiment.

FIG. 15 is a flowchart illustrating an operation of the image processing apparatus 100 at the time of capturing an image.

Steps S1501 to S1505 perform similar processing as steps S501 to S505 of FIG. 5.

In step S1504, if the control unit 101 determines that the private information is included in the metadata (Yes in step S1504), the processing proceeds to step S1506.

In step S1506, the control unit 101 generates metadata for opening to the public, based on the private metadata. This processing will be described using the location information as an example. In the present exemplary embodiment, the location information is treated in the form of an address. The address is obtained by converting values of the latitude and longitude obtained from the location acquisition unit 108. A known method may be used for the conversion. In the present exemplary embodiment, an address of the private metadata is treated as detail data including even a street address such as "2-34, □□ 1-chome, ∆∆-ku (ward), xx-shi (city), ○○-ken (prefecture)". In contrast, simple data in which a district name and a street address are omitted such as "∆∆-ku, xx-shi, ○○-ken" is used for the metadata for opening to the public. If the control unit 401 determines that the location information is private information, for example, the control unit 401 generates metadata for opening to the public like "∆-ku, xx-shi, ○○-ken" based on the location information of "2-34, □□ 1-chome, ∆∆-ku, xx-shi, ○○-ken". The metadata for opening to the public is an example of simple image-capturing information.

In step S1507, the control unit 101 transmits the private metadata and the metadata for opening to the public generated based thereon to the information processing apparatus 200 together with the corresponding passwords. Here, it is assumed that two kinds of passwords, one corresponding to the private metadata and another corresponding to the metadata for opening to the public, are set in advance by the operation of the menu by the user.

In step S1508, the control unit 101 receives the response to the transmitted private metadata and metadata for opening to the public. This response includes IDs corresponding to the item of the metadata one for one. That is, the private information and the information for opening to the public for one item are managed by the same ID.

In step S1509, the control unit 101 records the address of the information processing apparatus 200 and the received ID in the header area of the image, similarly to step S508 of FIG. 5. Then, the processing ends.

Figure 16:
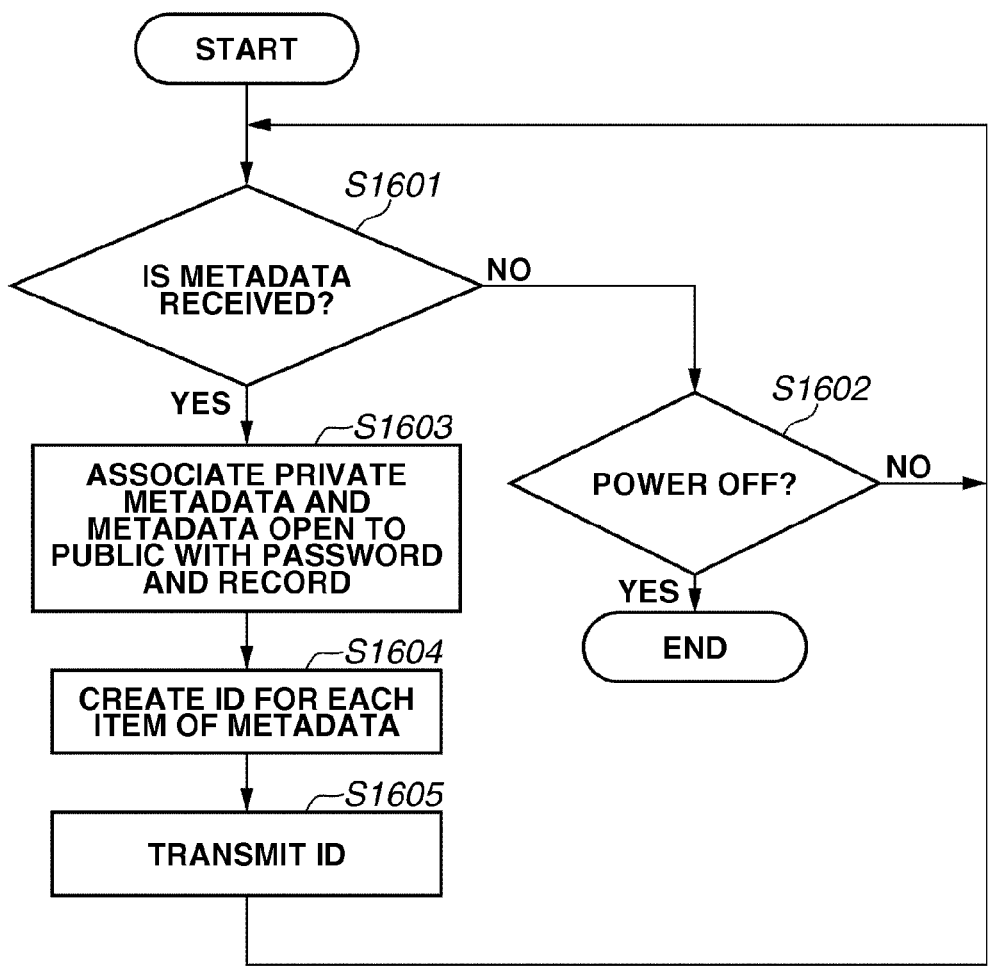
FIG. 16 is a flowchart illustrating an operation of an information processing apparatus according to the third exemplary embodiment.

The operation of the image processing apparatus 100 in the present exemplary embodiment has been described above. Next, an operation of the information processing apparatus 200 corresponding thereto will be described below. FIG. 16 is a flowchart illustrating an operation of the information processing apparatus 200.

Steps S1601 and S1602 perform similar processing to steps S801 and S802 of FIG. 8.

In step S1603, the control unit 201 associates the received private metadata with the corresponding password and the metadata for opening to the public with the corresponding password and records the metadata in the recording medium 210.

In step S1604, the control unit 201 generates a unique ID for each item of the received metadata and associates the ID with each of the items of the received metadata. FIG. 19 illustrates a management table of the metadata managed in the information processing apparatus 200 of the present exemplary embodiment. In the present exemplary embodiment, as illustrated in FIG. 19, a common ID is associated with each of the items of the metadata and passwords are associated with the private metadata and the metadata for opening to the public, respectively.

Continuously, in step S1605, the control unit 201 transmits the corresponding ID to the image processing apparatus 100 as a response to the metadata received from the image processing apparatus 100. Then, the processing returns to step S1601.

The operation of the information processing apparatus 200 has been described above.

Next, access to the image to which the link information is added in the present exemplary embodiment will be described. Since the operation of the external apparatus 400 is similar to that of FIG. 10, the description thereof will be omitted. The operation of the information processing apparatus 200 corresponding to the operation of the external apparatus 400 in the present exemplary embodiment will be described.

Figure 17:
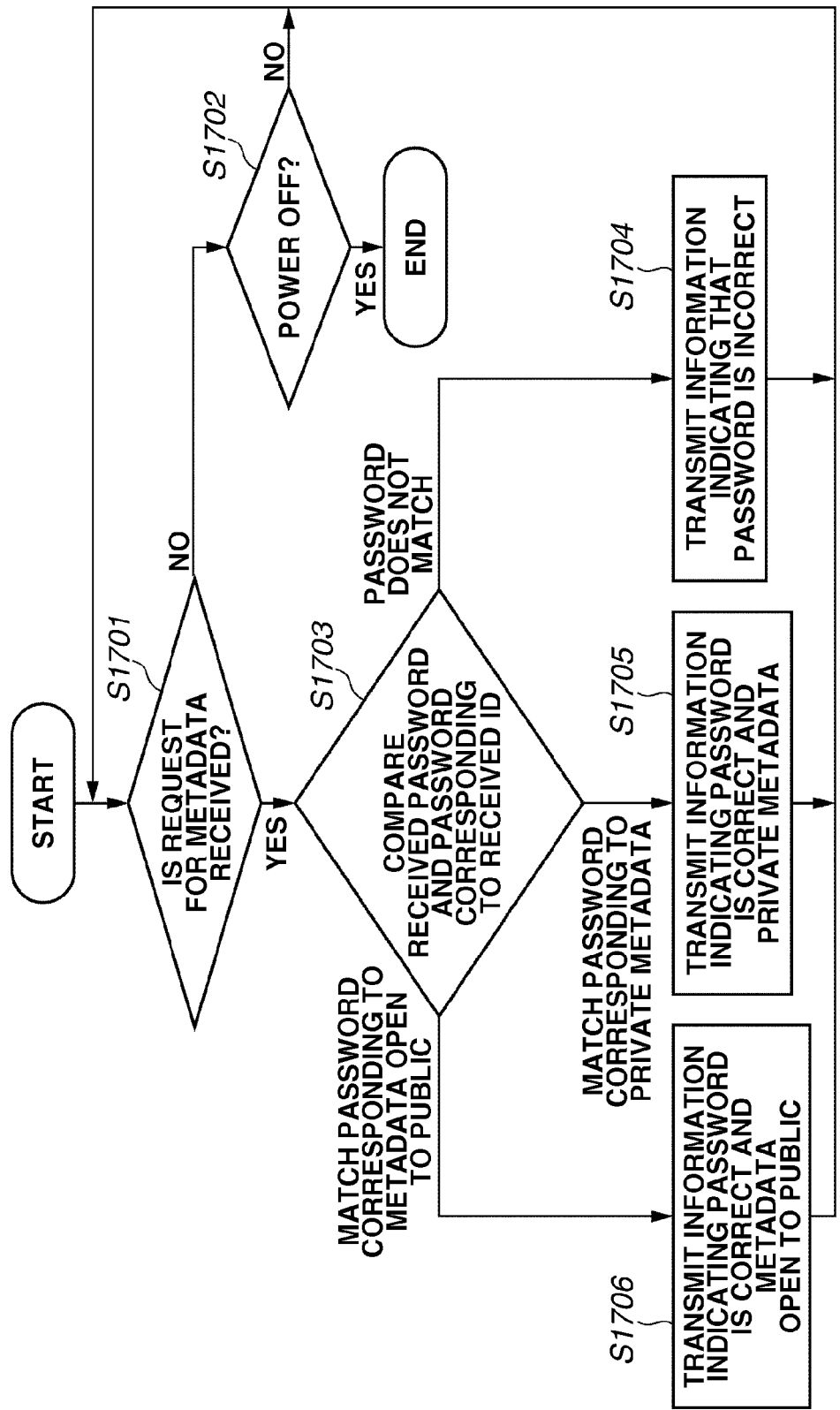
FIG. 17 is a flowchart illustrating an operation of the information processing apparatus according to the third exemplary embodiment.

FIG. 17 is a flowchart illustrating the operation of the information processing apparatus 200. The processing illustrated in the flowchart is performed in parallel with the processing illustrated in FIG. 16.

Steps S1701 and S1702 perform similar processing to that in steps S1201 and S1202 of FIG. 12.

In step S1703, the control unit 201 compares the received password with a password corresponding to the received ID. Here, two kinds of comparisons of the received password with the password corresponding to the private information and of the received password with the password corresponding to the information for opening to the public are performed. For example, if the location ID and the password corresponding to the metadata for opening to the public are transmitted from the external apparatus 400, the control unit 201 reads out passwords corresponding to the corresponding private metadata and the corresponding the metadata for opening to the public, based on the location ID. Then, the control unit 201 compares the received password with these two passwords, respectively.

As a result of the comparison, if the received password does not match the password corresponding to the private information nor the password corresponding to the information for opening to the public, the processing proceeds to step S1704.

In step S1704, similar to step S1204 of FIG. 12, the control unit 201 transmits information indicating that the password is incorrect to the external apparatus 400. Then, the processing returns to step S1701.

On the other hand, as a result of the comparison, if the received password matches the password corresponding to the private information, the processing proceeds to step S1705.

In step S1705, similar to step S1205 of FIG. 12, the control unit 201 transmits information indicating that the password is correct and the private metadata corresponding to the request to the external apparatus 400. Then, the processing returns to step S1701.

Further, as a result of the comparison, if the received password matches the password corresponding to the information for opening to the public, the processing proceeds to step S1706.

In step S1706, similar to step S1205 of FIG. 12, the control unit 201 transmits information indicating that the password is correct and the metadata for opening to the public corresponding to the request to the external apparatus 400. Then, the processing returns to step S1701.

The operation of the information processing apparatus 200 corresponding to the operation of the external apparatus 400 in the present exemplary embodiment has been described above.

As described above, in the present exemplary embodiment, an example in which information for opening to the public is generated and which of the private information and the information for opening to the public is displayed is switched based on the password, has been described. In this way, it is possible to distinguish the user based on which password a user knows so that information which has different levels of opening to the public for each user can be displayed. That is, contents of private information for opening to the public can be flexibly changed corresponding to a user.

In the above-described exemplary embodiment, an example in which the information processing apparatus 200 generates the ID corresponding to the item of the metadata has been described. However, the ID may be generated in the image processing apparatus 100 and the private metadata, the ID, and the password may be transmitted to the information processing apparatus 200. In this case, a unique ID is included for every image processing apparatus so that a unique ID can be generated.

Further, in the above-described exemplary embodiment, an example in which the ID is added at the time of capturing an image has been described. However, at the time of capturing an image, similar to a general image processing apparatus, the metadata may be added to the image to be stored, and the metadata may be converted into an ID when the image is output to the outside.

In the above-described third exemplary embodiment, an example in which two kinds of the private metadata and the metadata for opening to the public generated based on the private metadata, has been described. As for the operation, the level of opening to the public can be divided into multiple steps to be more specific and can be switched in three or more metadata.

Further, in addition to the above-described exemplary embodiment, metadata, which is determined as the private information, may be associated with an image to be recorded in the nonvolatile memory 103. In addition, with the association, the metadata is not recorded in the header area of the image like the metadata which is determined not to be the private information, but is stored in the nonvolatile memory 103 as separate information from the image, rather than in the recording medium 110. In other words, even though the image is open to other apparatuses, the metadata is not open. With this configuration, when the image captured by the image processing apparatus 100 is viewed using its own devices, the control unit 101 does not request the metadata to the information processing apparatus 200, but reads out the private information recorded in the recording medium 110 and displays the private information. In this way, when the metadata of the image captured by itself is viewed by itself, it is possible to save the time and effort to access the information processing apparatus 200. Further, it is possible to determine whether the image is captured by itself by referring to the model name added to the image or checking whether the location information stored to be associated is present.

Further, in the above-described exemplary embodiment, even though the restriction on display may be released for each item of the metadata, instead of or in addition to this, all restrictions may be released by one request. In this way, even when the display of a plurality of items of the metadata is restricted, a user may input a password only once to display all of the items.

Further, in the above-described third exemplary embodiment, a password is set even for the metadata for opening to the public. On the other hand, the password is not set for the metadata for opening to the public nor managed by the information processing apparatus 200. In this case, the metadata for opening to the public and link information for accessing the private metadata are recorded in the header area of the image. Thus, for example, instead of a message indicating that "viewing is restricted" of FIG. 9B, the metadata for opening to the public may be displayed. Therefore, the metadata for opening to the public can be viewed without inputting the password. In addition, a button is displayed to receive an instruction to prepare the private metadata. With this configuration, the private metadata can be open to a user who knows the password.

Further, in the above-described exemplary embodiment, a user is distinguished by the password. However, other information may also be used. For example, a case of using a mail address of a mobile phone will be described as an example. A user of the image processing apparatus 100 inputs a mail address of the mobile phone of the user whose private information may be open to public by operating the menu in advance. The user may manually input the mail address by a software keyboard using the operation unit 105 or by communication between the mobile phone and the image processing apparatus 100. The mail address thus input is stored in the nonvolatile memory 103 of the image processing apparatus 100. In the subsequent processing, the main address is used instead of the password. For example, in the information processing apparatus 200, the metadata is associated with the mail address. In addition, if the mail address is used, a plurality of mail addresses may be associated with the metadata. At the time of accessing the image, instead of the password, it is requested to input the mail address of the mobile phone of the viewer. In this way, it is possible to save the time and effort to transfer the password from the user of the image processing apparatus 100 to the viewer. Further, such a mail address is an example of the access condition.

Further, in the above-described exemplary embodiment, a case where a device that generates an image and a device that generates link information are separate bodies has been described. On the other hand, if the device that generates the image has a server function that can receive access from the external apparatus, the link information may be generated by the device that generates the image. That is, the link information in this case includes information for acquiring the metadata from the image processing apparatus 100.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-111888 filed May 15, 2012, which is hereby incorporated by reference herein in its entirety.

What is claimed is:

1. An image processing apparatus connectable with an information processing apparatus, comprising:
   an acquisition unit configured to acquire an image obtained by image-capturing an object;
   a unit configured to acquire image capturing information indicating information on image-capturing of the object;
   a determination unit configured to determine whether the image capturing information is private information;
   an association unit configured to, in a case where the determination unit determines that the image capturing information is not private information, associate the image capturing information with the image; and
   a transmission unit configured to, in a case where the determination unit determines that the image capturing information is private information, transmit the image capturing information to the information processing apparatus,
   wherein in a case where the determination unit determines that the image capturing information is private information, the association unit associates link information with the image, instead of associating the image capturing information with the image,
   wherein the link information is information for acquiring the image capturing information from the information processing apparatus based on an access condition set in the image capturing information.

2. The image processing apparatus according to claim 1, further comprising a unit configured to set a determination criterion of the determination unit based on the operation of a user of the image processing apparatus,
   wherein the determination unit determines whether the image capturing information is the private information in accordance with the determination criterion.

3. The image processing apparatus according to claim 1, wherein the image capturing information is location information indicating a location where image-capturing of the object is performed, and if the location information indicates a predetermined range set by a user of the image processing apparatus, the determination unit determines that the location information is private information.

4. The image processing apparatus according to claim 1, further comprising a reception unit configured to receive the link information from the information processing apparatus.

5. The image processing apparatus according to claim 4, wherein the reception unit receives the link information as a response to the image capturing information, which is transmitted by the transmission unit, from the information processing apparatus.

6. The image processing apparatus according to claim 1, wherein the link information includes information for specifying the image capturing information transmitted to the information processing apparatus.

7. The image processing apparatus according to claim 1, further comprising a setting unit configured to set a password as the access condition.

8. The image processing apparatus according to claim 1, further comprising a setting unit configured to set a mail address as the access condition.

9. The image processing apparatus according to claim 1, further comprising a setting unit configured to set a password or a mail address as the access condition,
   wherein the transmission unit transmits the set access condition set by the setting unit to the information processing apparatus together with the image capturing information determined to be private information by the determination unit.

10. The image processing apparatus according to claim 1, further comprising an image capturing unit configured to perform image-capturing of the object to obtain an image,
    wherein the acquisition unit acquires the image using the image capturing unit to perform image-capturing of the object.

11. The image processing apparatus according to claim 1, further comprising a unit configured to, in a case where the determination unit determines that the image capturing information is the private information, generate information open to the public based on the image capturing information,
    wherein the transmission unit transmits simple image capturing information, which is simpler than the information indicated by the image capturing information, to the information processing apparatus.

12. An image processing system including an information processing apparatus and an image processing apparatus,
    the image processing apparatus comprising:
    an acquisition unit configured to acquire an image obtained by image-capturing an object;
    a unit configured to acquire image capturing information indicating information on image-capturing of the object;
    a determination unit configured to determine whether the image capturing information is private information;
    an association unit configured to, in a case where the determination unit determines that the image capturing information is not private information, associate the image capturing information with the image; and
    a transmission unit configured to, in a case where the determination unit determines that the image capturing information is private information, transmit the image capturing information to the information processing apparatus,
    wherein in a case where the determination unit determines that the image capturing information is private information, the association unit associates link information with the image, instead of associating the image capturing information with the image,
    wherein the link information is information for acquiring the image capturing information from the information processing apparatus based on an access condition set in the image capturing information, and
    the information processing apparatus comprising:
    a storage unit configured to store the access condition and the image capturing information transmitted by the transmission unit so as to be associated with each other;
    a generation unit configured to generate link information for specifying the image capturing information transmitted by the transmission unit; and
    a unit configured to transmit link information generated by the generation unit to the image processing apparatus.

13. A control method for an image processing apparatus connectable with an information processing apparatus, the method comprising:
    acquiring an image obtained by image-capturing an object;
    acquiring image capturing information indicating information on image-capturing of the object;
    determining whether the image capturing information is private information;
    associating the image capturing information with the image in a case where it is determined that the image capturing information is not private information; and transmitting the image capturing information to the information processing apparatus in a case where it is determined that the image capturing information is private information, wherein, in a case where it is determined that the image capturing information is private information, associating link information with the image, instead of associating the image capturing information with the image wherein the link information is information for acquiring the image capturing information from the information processing apparatus based on an access condition set in the image capturing information.

14. A non-transitory computer readable recording medium which records a program for causing a computer to execute a method according to claim 13.

\* \* \* \* \*